US012436618B2

(12) United States Patent
Lee et al.

(10) Patent No.: US 12,436,618 B2
(45) Date of Patent: Oct. 7, 2025

(54) ELECTRONIC DEVICE INCLUDING DUAL VIBRATION MOTORS, AND METHOD THEREFOR

(71) Applicant: SAMSUNG ELECTRONICS CO., LTD., Suwon-si (KR)

(72) Inventors: Jookwan Lee, Suwon-si (KR); Moonchul Shin, Suwon-si (KR); Yangwook Kim, Suwon-si (KR); Jihea Park, Suwon-si (KR); Junghyeob Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/919,430

(22) Filed: Oct. 18, 2024

(65) Prior Publication Data

US 2025/0044873 A1 Feb. 6, 2025

Related U.S. Application Data

(63) Continuation of application No. PCT/KR2023/002065, filed on Feb. 13, 2023.

(30) Foreign Application Priority Data

Apr. 18, 2022 (KR) .......................... 10-2022-0047573
Jul. 15, 2022 (KR) .......................... 10-2022-0087842

(51) Int. Cl.
*G06F 3/01* (2006.01)
*G06F 1/16* (2006.01)
(Continued)

(52) U.S. Cl.
CPC ............ *G06F 3/016* (2013.01); *G06F 1/1652* (2013.01); *G06F 3/0416* (2013.01); *G06F 3/044* (2013.01); *G06F 2203/04102* (2013.01)

(58) Field of Classification Search
None
See application file for complete search history.

(56) References Cited

U.S. PATENT DOCUMENTS 9,823,833 B2    11/2017  Grant et al.
10,567,562 B2    2/2020  Lee et al.
(Continued)

FOREIGN PATENT DOCUMENTS

CN       113329109 A    8/2021
KR     20100007380 A    1/2010
(Continued)

OTHER PUBLICATIONS

International Search Report and Written Opinion mailed May 10, 2023 for PCT/KR2023/002065, citing the above reference(s).

*Primary Examiner* — Stephen T. Reed
(74) *Attorney, Agent, or Firm* — CANTOR COLBURN LLP

(57) ABSTRACT

An electronic device includes: a first housing; a second housing movably coupled with respect to the first housing; a flexible display; a first vibration motor in the first housing; a second vibration motor in the second housing; and at least one processor. The at least one processor: receives a touch input through a display region of the flexible display; in response to the touch input, identifies a first distance between the position of a contact point of the touch input and the first vibration motor, and a second distance between the position and the second vibration motor; and adjusts, on the basis of the first distance and the second distance, the strength of vibration provided through the first vibration motor and the second vibration motor so as to provide a haptic notification.

20 Claims, 25 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 11,054,857 B2 * | 7/2021 | Noh | G06F 1/1643 |
| 11,095,761 B1 | 8/2021 | Lim et al. | |
| 11,221,676 B2 | 1/2022 | Song et al. | |
| 11,281,256 B2 | 3/2022 | Yoshizumi | |
| 2009/0184808 A1 | 7/2009 | Kim | |
| 2019/0196589 A1 | 6/2019 | Shim et al. | |
| 2020/0218353 A1 | 7/2020 | Song et al. | |
| 2023/0048158 A1 * | 2/2023 | Kim | G06F 1/1677 |
| 2024/0085956 A1 * | 3/2024 | Zhu | G06F 1/1652 |

FOREIGN PATENT DOCUMENTS

| | | |
|---|---|---|
| KR | 101473037 B1 | 12/2014 |
| KR | 20190071824 A | 6/2019 |
| KR | 20190076656 A | 7/2019 |
| KR | 20200085174 A | 7/2020 |
| KR | 20200109737 A | 9/2020 |
| KR | 102288812 B1 | 8/2021 |
| KR | 102562126 B1 | 8/2023 |
| WO | 2022019358 A1 | 1/2022 |

* cited by examiner

ELECTRONIC DEVICE INCLUDING DUAL VIBRATION MOTORS, AND METHOD THEREFOR

CROSS-REFERENCE TO RELATED APPLICATIONS

This application is a continuation application, under 35 U.S.C. § 111 (a), of International Patent Application No. PCT/KR2023/002065, filed on Feb. 13, 2023, which claims priority to Korean Patent Application No. 10-2022-0047573, filed on Apr. 18, 2022 and Korean Patent Application No. 10-2022-0087842, filed on Jul. 15, 2022, the content of which in their entirety is herein incorporated by reference.

FIELD

The disclosure relates to an electronic device including dual vibration motors, and a method therefor.

BACKGROUND ART

In order to achieve portability and usability of an electronic device, a rollable display is being developed that may provide a relatively large screen display when desired. The rollable display may mean a flexible display, a foldable display, or a slidable display.

The electronic device may provide a haptic notification to a user. In an embodiment, the electronic device may provide the haptic notification based on a touch input of the user. The electronic device may include a vibration motor for providing the haptic notification.

SUMMARY

In a flexible display of an electronic device, an area of a display area may be expanded or reduced according to a movement of a housing. In order to expand or reduce the size of the display area of the flexible display, the electronic device may include two or more housings that may be movably coupled to each other. According to the movement of the two or more housings, vibration transmitted from a vibration motor in the housing to the display area may vary.

The electronic device according to various embodiments may provide vibration of substantially the same intensity to the entirety of the display area.

The technical problems to be achieved in this document are not limited to those described above, and other technical problems not mentioned herein will be clearly understood by those having ordinary knowledge in the art to which the disclosure belongs, from the following description.

An electronic device in an embodiment may include a first housing, a second housing, a flexible display, a first vibration motor, a second vibration motor, and at least one processor. The second housing may be movably coupled to the first housing in a first direction or a second direction opposite to the first direction with respect to the first housing. The flexible display may be capable of sliding-in into the first housing as the second housing moves in the first direction. The flexible display may be capable of sliding-out from the first housing according to a movement in the second direction. A first vibration motor may be disposed in the first housing. A second vibration motor may be disposed in the second housing. The at least one processor may be operably connected to the first vibration motor and the second vibration motor. The at least one processor may be configured to receive a touch input for the flexible display. The at least one processor may be configured to identify in response to the touch input, a first distance between a location of a contact point of the touch input and the first vibration motor, and a second distance between the location and the second vibration motor. The at least one processor may be configured to provide a haptic notification for the touch input, adjusting a vibration intensity of the first vibration motor and the second vibration motor based on identifying the first distance and the second distance.

A method of the electronic device in an embodiment may include receiving the touch input for the flexible display of the electronic device, identifying, in response to the touch input, the first distance between the location of the contact point of the touch input and the first vibration motor disposed in the first housing of the electronic device, and the second distance between the location and the second vibration motor disposed in the second housing of the electronic device, and providing the haptic notification for the touch input, adjusting an intensity of vibration to be provided through the first vibration motor and the second vibration motor based on identifying the first distance and the second distance.

An electronic device may include vibration motors disposed on each of movable coupled housings. The electronic device in an embodiment may provide a haptic notification of a constant intensity to a user by controlling an operation of vibration motors based on a contact point of a touch input.

The effects that may be obtained from the disclosure are not limited to those described above, and any other effects not mentioned herein will be clearly understood by those having ordinary knowledge in the art to which the disclosure belongs, from the following description.

DETAILED DESCRIPTION

Figure 1:
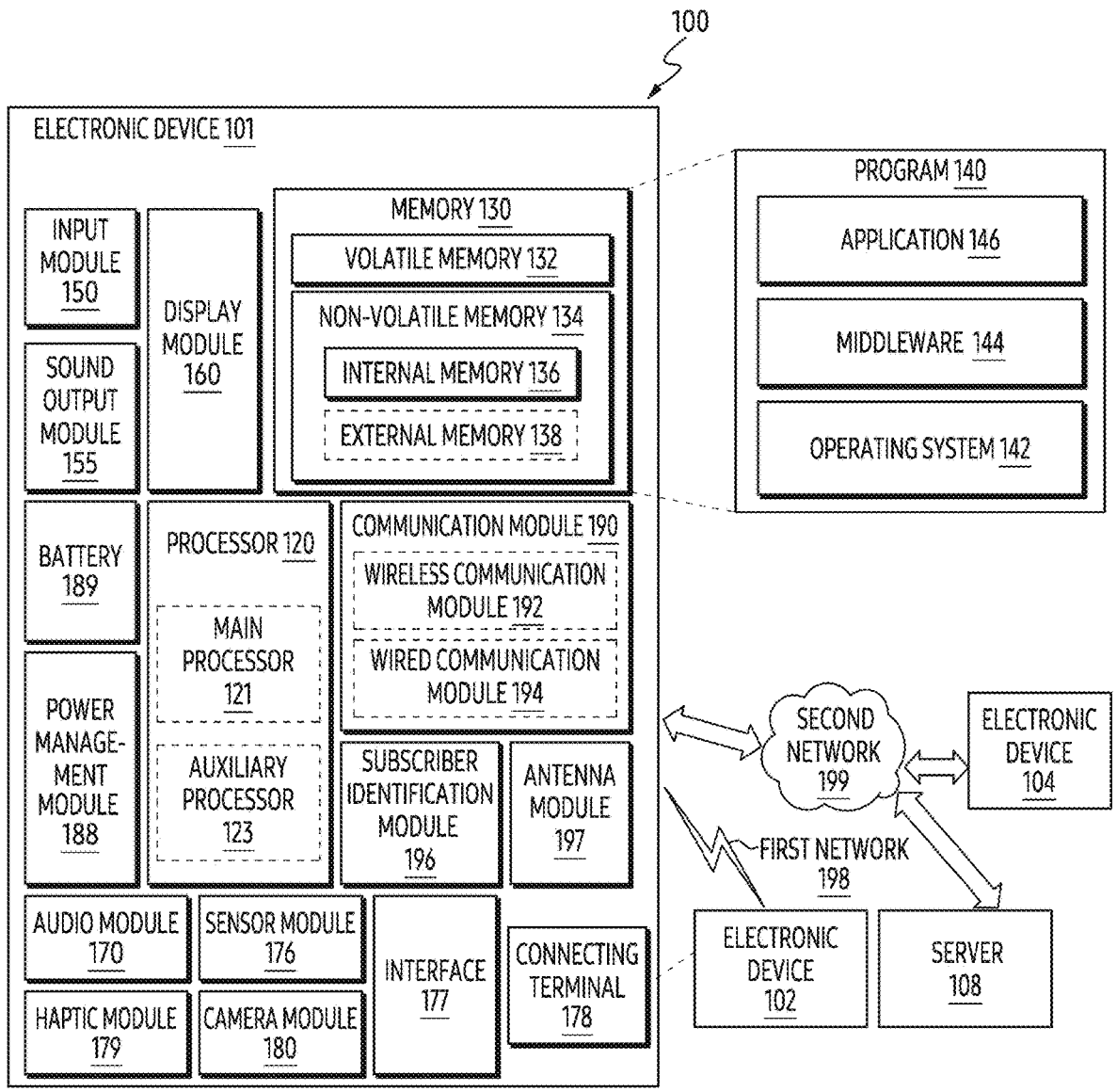
FIG. 1 is a block diagram illustrating an embodiment of an electronic device in a network environment.

FIG. 1 is a block diagram illustrating an embodiment of an electronic device 101 in a network environment 100.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. In an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. In an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. In an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an embodiment, when the electronic device 101 includes the main processor 121 and the auxiliary processor 123, the auxiliary processor 123 may be adapted to consume less power than the main processor 121, or to be specific to a specified function, for example. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. In an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. In an embodiment, the display module 160 may include a touch sensor adapted to detect a touch, or a pressure sensor adapted to measure the intensity of force incurred by the touch.

The audio module 170 may convert a sound into an electrical signal and vice versa. In an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In an embodiment, the haptic module 179 may include, for example, a motor, a piezoelectric element, or an electric stimulator.

The camera module 180 may capture a still image or moving images. In an embodiment, the camera module 180 may include one or more lenses, image sensors, image signal processors, or flashes.

The power management module 188 may manage power supplied to the electronic device 101. In an embodiment, the power management module 188 may be implemented as at least part of, for example, a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a relatively high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or relatively large scale antenna. The wireless communication module 192 may support various conditions specified in the electronic device 101, an external electronic device (e.g., the electronic device 104), or a network system (e.g., the second network 199). In an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element composed of a conductive material or a conductive pattern defined in or on a substrate (e.g., a printed circuit board (PCB)). In an embodiment, the antenna module 197 may include a plurality of antennas (e.g., array antennas). In such a case, at least one antenna appropriate for a communication scheme used in the communication network, such as the first network 198 or the second network 199, may be selected, e.g., by the communication module 190 (e.g., the wireless communication module 192) from the plurality of antennas. The signal or the power may then be transmitted or received between the communication module 190 and the external electronic device via the selected at least one antenna. In an embodiment, another component (e.g., a radio frequency integrated circuit (RFIC)) other than the radiating element may be additionally formed as part of the antenna module 197.

According to various embodiments, the antenna module 197 may form a mmWave antenna module. In an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. In an embodiment, all or some of operations to be executed at the electronic device 101 may be executed at one or more of the external electronic devices 102, 104, or 108. In an embodiment, when the electronic device 101 should perform a function or a service automatically, or in response to a request from a user or another device, the electronic device 101, instead of, or in addition to, executing the function or the service, may request the one or more external electronic devices to perform at least part of the function or the service, for example. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. In an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
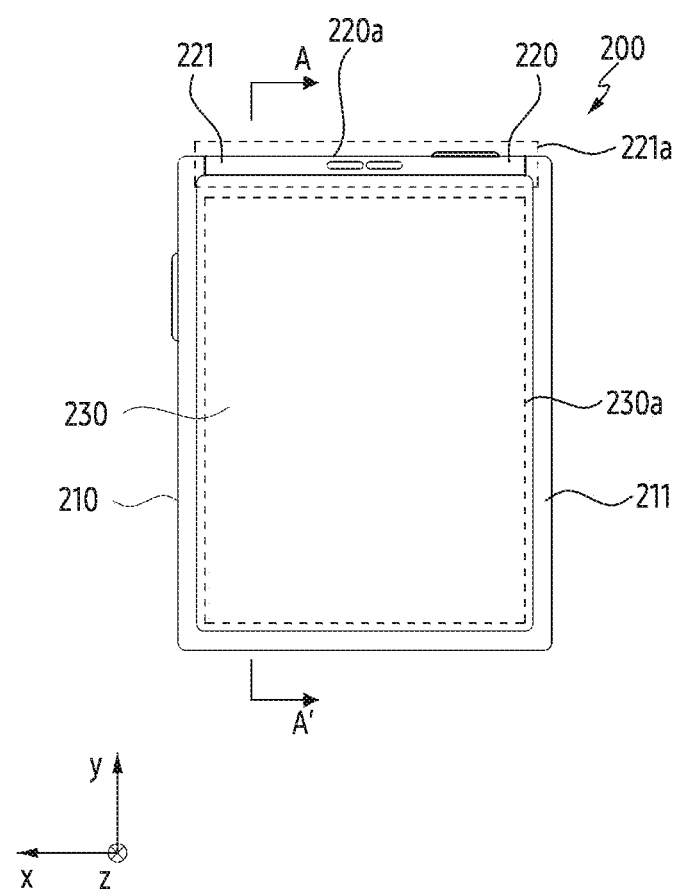
FIG. 2A is a front view of an embodiment of an electronic device in a first state.
Figure 2B:
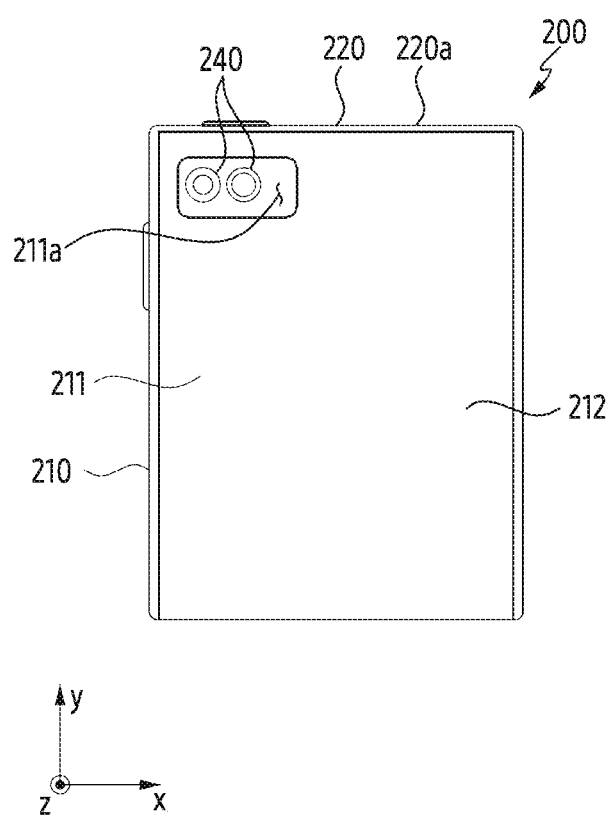
FIG. 2B is a rear view of an embodiment of an electronic device in a first state.
Figure 2C:
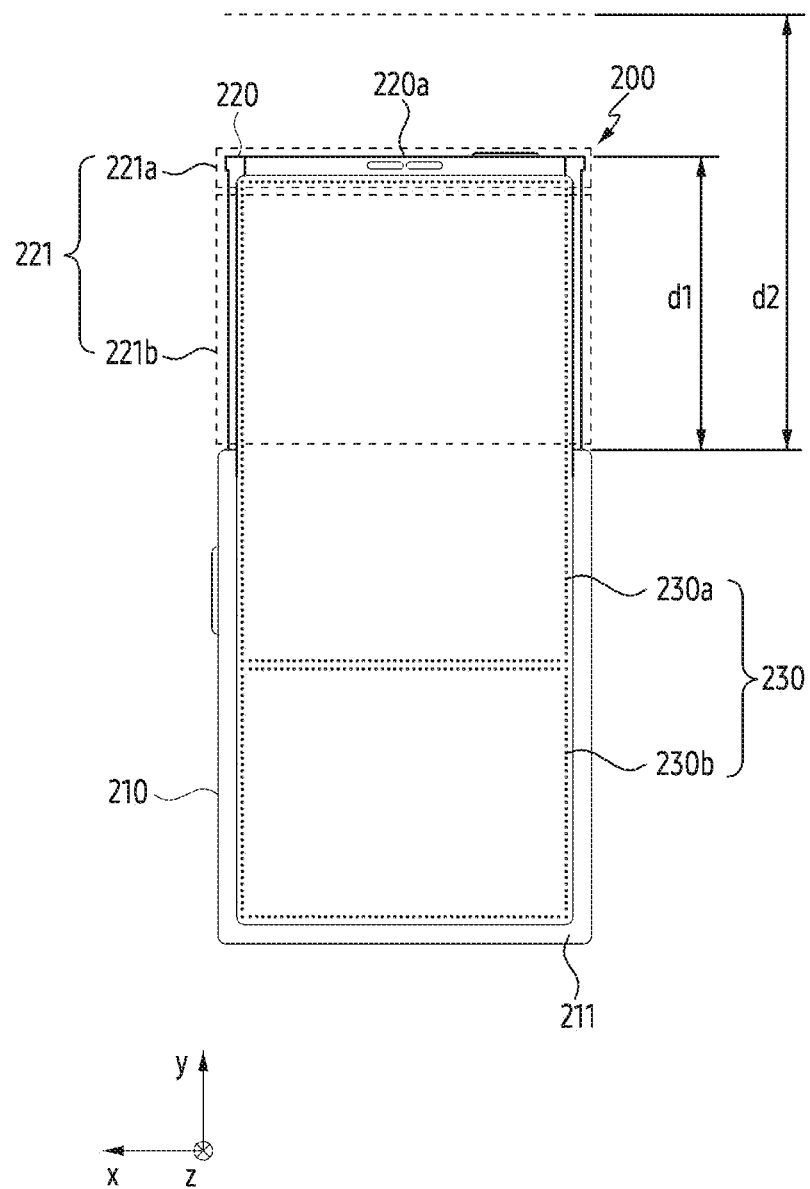
FIG. 2C is a front view of an embodiment of an electronic device in a second state.
Figure 2D:
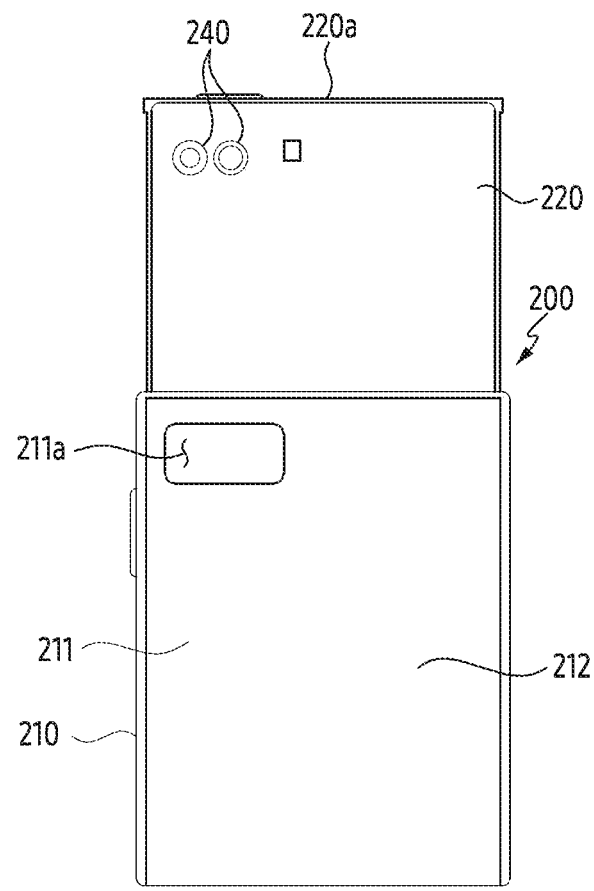
FIG. 2D is a rear view of an embodiment of an electronic device in the second state.

FIG. 2A is a front view of an embodiment of an electronic device in a first state. FIG. 2B is a rear view of an embodiment of an electronic device in a first state. FIG. 2C is a front view of an embodiment of an electronic device in a second state. FIG. 2D is a rear view of an embodiment of an electronic device in the second state.

Referring to FIGS. 2A, 2B, 2C, and 2D, the electronic device 200 (e.g., an electronic device 101 of FIG. 1) in an embodiment may include a first housing 210, a second housing 220, a display 230 (e.g., a display module 160 of FIG. 1), and a camera 240 (e.g., a camera module 180 of FIG. 1). In an embodiment, the second housing 220 may be slidable relative to the first housing 210. In an embodiment, the second housing 220 may move in a designated distance along a first direction (e.g., +y direction) relative to the first housing 210, for example. When the second housing 220 moves along the first direction, the distance between a side 220a of the second housing 220 facing the first direction and the first housing 210 may increase. In another embodiment, the second housing 220 may move in the designated distance along a second direction (e.g., −y direction) opposite to the first direction relative to the first housing 210. When the second housing 220 moves along the second direction, the distance between the side 220a of the second housing 220 facing the first direction and the first housing 210 may decrease. In an embodiment, the second housing 220 may execute linear reciprocation relative to the first housing 210 by relatively sliding relative to the first housing 210. In an embodiment, at least a portion of the second housing 220 may be capable of sliding-in into the first housing 210 or may be capable of sliding-out from the first housing 210, for example.

In an embodiment, the electronic device 200 may be also referred to as a "slidable electronic device" as the second housing 220 is designed to be slidable relative to the first housing 210. In an embodiment, the electronic device 200 may be also referred to as a "rollable electronic device" as at least the portion of the display 230 is designed to be wound inside the second housing 220 (or the first housing 210) based on slide movement of the second housing 220.

In an embodiment, the first state of the electronic device 200 may be defined as the state in which the second housing 220 has moved in the second direction (e.g., contraction state, or slide-in state). In an embodiment, in the first state of the electronic device 200, the second housing 220 may be movable in the first direction, but may not be movable in the second direction, for example. In the first state of the electronic device 200, the distance between the side 220a of the second housing 220 and the first housing 210 may increase as the second housing 220 moves, but may not decrease. In another embodiment, in the first state of the electronic device 200, the portion of the second housing 220 may be capable of sliding-out from the first housing 210, but may not be capable of sliding-in into the first housing 210. In an embodiment, the first state of the electronic device 200 may be defined as the state in which a second region 230b of the display 230 is not visually exposed from the outside of the electronic device 200. In an embodiment, in the first state of the electronic device 200, the second region 230b of the display 230 may be disposed in the inside of the internal space (not illustrated) of the electronic device 200 formed by the first housing 210 and/or the second housing 220, and may not be visible from the outside of the electronic device 200, for example.

In an embodiment, the second state of the electronic device 200 may be defined as the state in which the second housing 220 has moved in the first direction (e.g., expanding state, or slide-out state). In an embodiment, in the second state of the electronic device 200, the second housing 220 may be movable in the second direction, but may not be movable in the first direction, for example. In the second state of the electronic device 200, the distance between the side 220*a* of the second housing 220 and the first housing 210 may decrease as the second housing 220 moves, but may not increase. In another embodiment, in the second state of the electronic device 200, the portion of the second housing 220 may be capable of sliding-in into the first housing 210, but may not be capable of sliding-out from the first housing 210. In an embodiment, the second state of the electronic device 200 may be defined as the state in which the second region 230*b* of the display 230 is visually exposed from the outside of the electronic device 200. In an embodiment, in the second state of the electronic device 200, the second region 230*b* of the display 230 may be slid out from the internal space of the electronic device 200 and visible from the outside of the electronic device 200, for example.

In an embodiment, in case that the second housing 220 moves from the first housing 210 in the first direction, at least the portion of the second housing 220 and/or the second region 230*b* of the display 230 may be slid out from the first housing 210 by a slide-out length d1 corresponding to the moving distance of the second housing 220. In an embodiment, the second housing 220 may reciprocate in the designated distance d2. In an embodiment, the slide-out length d1 may have a size of approximately 0 to the designated distance d2.

In an embodiment, the state of the electronic device 200 may be convertible between the second state and/or the first state, either by a manual operation by a user or by an automatic operation by a driving module (not illustrated) disposed inside the first housing 210 or the second housing 220. In an embodiment, an operation of the driving module may be triggered based on a user input. In an embodiment, the user input for triggering the operation of the driving module may include a touch input, a force touch input, and/or a gesture input through the display 230. In another embodiment, the user input for triggering the operation of the driving module may include a sound input (e.g., a voice input) or an input of a physical button exposed to the outside of the first housing 210 or the second housing 220. In an embodiment, the driving module may be driven in a semi-automatic manner in which the operation is triggered when a manual operation by an external force of the user is detected.

In an embodiment, the first state of the electronic device 200 may be also referred to as a first form, and the second state of the electronic device 200 may be also referred to as a second form. In an embodiment, the first form may include a normal state, a reduced state, or a closed state, and the second form may include an open state, for example. In an embodiment, the electronic device 200 may form a third state (e.g., an intermediate state) that is the state between the first state and the second state. In an embodiment, the third state may be also referred to as a third form, and the third form may include a free stop state, for example.

In an embodiment, the display 230 may be visible (or viewable) from the outside through a front direction (e.g., −z direction) of the electronic device 200 so that visual information may be displayed to the user. In an embodiment, the display 230 may include a flexible display, for example. In an embodiment, the display 230 may be disposed in the second housing 220 and may be slid out from the internal space (not illustrated) of the electronic device 200 or may be slid in into the internal space of the electronic device 200 according to movement of the second housing 220. The internal space of the electronic device 200 may mean a space in the first housing 210 and the second housing 220 formed by coupling the first housing 210 and the second housing 220. In an embodiment, in the first state of the electronic device 200, at least the portion of the display 230 may be rolled into the internal space of the electronic device 200 and slid in. When the second housing 220 moves in the first direction, in the state in which at least the portion of the display 230 is slid in into the internal space of the electronic device 200, at least the portion of the display 230 may be slid out from the internal space of the electronic device 200, for example. In another embodiment, when the second housing 220 moves in the second direction, at least the portion of the display 230 may be rolled into the internal space of the electronic device 200 and slid in into the internal space of the electronic device 200. As at least the portion of the display 230 is slid out or slid in, an area of the display 230 visible from the outside of the electronic device 200 may be expanded or reduced. In an embodiment, the display 230 may include a first region 230*a* and the second region 230*b*.

In an embodiment, the first region 230*a* of the display 230 may mean a region of the display 230 that may be fixedly visible from the outside of the electronic device 200 regardless of whether the electronic device 200 is in the second state or the first state. In an embodiment, the first region 230*a* may mean a partial region of the display 230 that is not rolled into the internal space of the electronic device 200, for example. In an embodiment, when the second housing 220 moves, the first region 230*a* may move together with the second housing 220. In an embodiment, when the second housing 220 moves along the first direction or the second direction, the first region 230*a* may move along the first direction or the second direction on a front surface of the electronic device 200 together with the second housing 220, for example.

In an embodiment, the second region 230*b* of the display 230 may be connected to the first region 230*a* and may be slid in into the internal space of the electronic device 200 or may be slid out from the internal space of the electronic device 200 according to movement of the second housing 220. In an embodiment, the second region 230*b* of the display 230 may be a slide-in state in the internal space of the electronic device 200 in the rolled state in the first state of the electronic device 200, for example. The second region 230*b* of the display 230 may be slid in into the internal space of the electronic device 200 in the first state of the electronic device 200 and may not be visible from the outside. In another embodiment, the second region 230*b* of the display 230 may be a slide-out state from the internal space of the electronic device 200 in the second state of the electronic device 200. The second region 230*b* of the display 230 may be visible from the outside of the electronic device 200 in the second state.

In an embodiment, in the first state of the electronic device 200, the area of the display 230 visible from the outside of the electronic device 200 may include only the first region 230*a* of the display 230. In the second state of the electronic device 200, the area of the display 230 visible from the outside of the electronic device 200 may include at least the portion of the first region 230*a* and the second region 230*b* of the display 230.

In an embodiment, the first housing 210 of the electronic device 200 may include a book cover 211 surrounding the internal space of the first housing 210 and a rear plate 212 surrounding a rear surface of the book cover 211. The second housing 220 of the electronic device 200 may include a front cover 221 surrounding the internal space of the electronic device 200.

In an embodiment, the front cover 221 may include a first cover region 221a of the front cover 221 that is not inserted into the inside of the first housing 210 and a second cover region 221b that is inserted into or slid out from the first housing 210. The first cover region 221a of the front cover 221 may always be visible regardless of whether the electronic device 200 is in the second state and the first state. In an embodiment, at least the portion of the first cover region 221a of the front cover 221 may form the side 220a of the second housing 220. In an embodiment, the second cover region 221b of the second housing 220 may not be visible in the first state, but may be visible in the second state.

The camera 240 may obtain an image of a subject based on receiving light from the outside of the electronic device 200. In an embodiment, the camera 240 may include one or more lenses, an image sensor, and/or an image signal processor. In an embodiment, the camera 240 may be disposed in the second housing 220 to face the rear of the electronic device 200 opposite to the front of the electronic device 200 in which the first region 230a of the display 230 is disposed. In an embodiment, the camera 240 is disposed on the front cover 221 of the second housing 220, and when the electronic device 200 is in the first state, it may be visible from the outside of the electronic device 200 through an opening 211a defined in the book cover 211, for example. In another embodiment, the camera 240 is disposed on the front cover 221 of the second housing 220, and when the electronic device 200 is in the first state, it is covered by the book cover 211 and/or the rear plate 212, and it may not be visible from the outside of the electronic device 200.

In an embodiment, the camera 240 may include a plurality of cameras. In an embodiment, the camera 240 may include a wide-angle camera, an ultra-wide-angle camera, a telephoto camera, a proximity camera, and/or a depth camera, for example. However, the camera 240 is not necessarily limited to including the plurality of cameras, and may include one camera.

In an embodiment, the camera 240 may further include a camera (not illustrated) aimed at the front of the electronic device 200 in which the first region 230a of the display 230 is disposed. In case that the camera 240 faces the front of the electronic device 200, the camera 240 may be an under-display camera (UDC) disposed below (e.g., in the +z direction from the display 230) the display 230, but is not limited thereto.

In an embodiment, the electronic device 200 may include a sensor module (not illustrated) and/or a camera module (not illustrated) disposed under the display 230. The sensor module may detect an external environment based on information (e.g., light) received through the display 230. In an embodiment, the sensor module may include at least one of a receiver, a proximity sensor, an ultrasonic sensor, a gesture sensor, a gyro sensor, a pressure sensor, a magnetic sensor, an acceleration sensor, a grip sensor, a color sensor, an infrared sensor (IR) sensor, a biometric sensor, a temperature sensor, a humidity sensor, a motor encoder, or an indicator. In an embodiment, at least the portion of sensor module of the electronic device 200 may be visually exposed from the outside through a partial region of the display 230. In an embodiment, the electronic device 200 may detect the slide-out length (e.g., length A) using the sensor module. In an embodiment, the electronic device 200 may generate slide-out information on the degree being slid out detected by the sensor. In an embodiment, by slide-out information, the electronic device 200 may detect and/or check the degree in which the second housing 220 is slid out, for example. In an embodiment, slide-out information may include information on slide-out length of the second housing 220.

In an embodiment, a coupling form of the first housing 210 and the second housing 220 is not limited to a form and a coupling illustrated in FIGS. 2A, 2B, 2C, and 2D, and may be implemented by a combination and/or a coupling of other form or component.

Figure 3A:
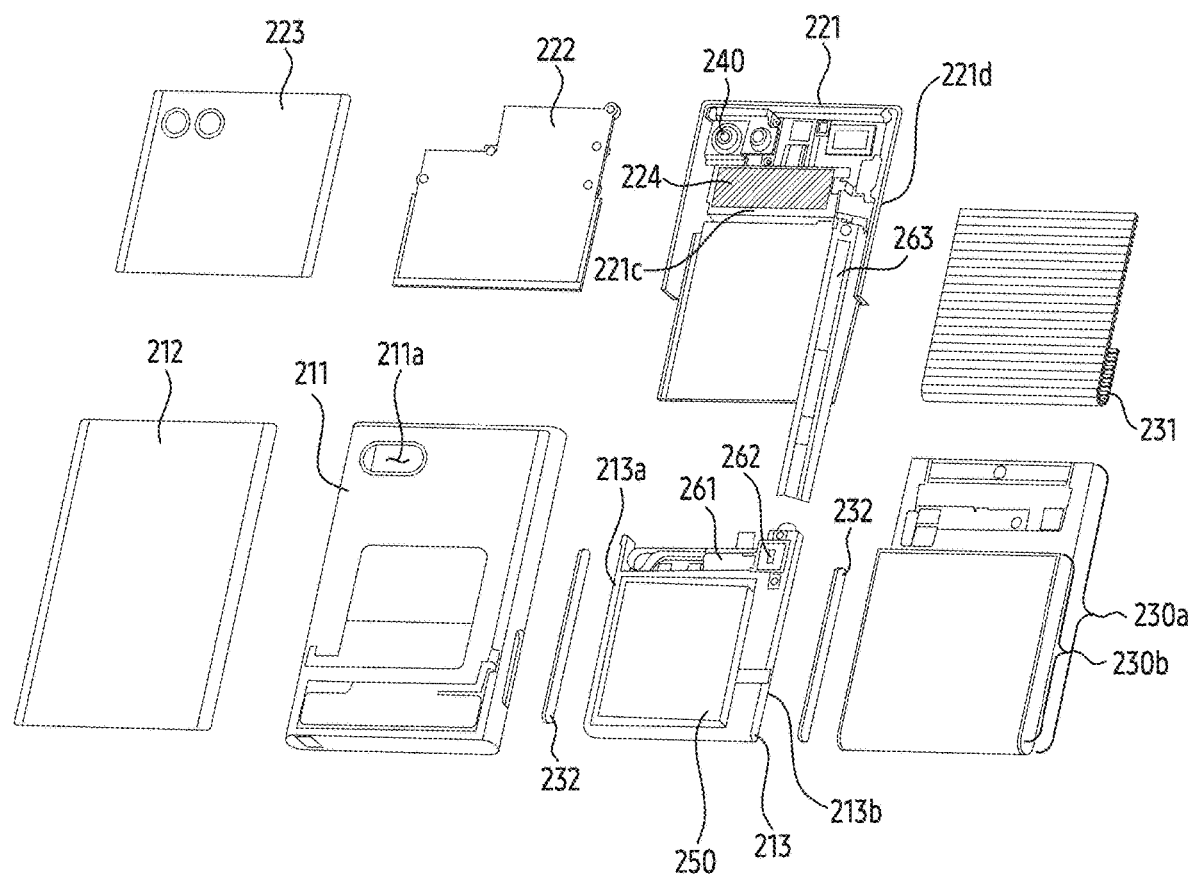
FIG. 3A is an exploded perspective view of an embodiment of an electronic device.
Figure 3B:
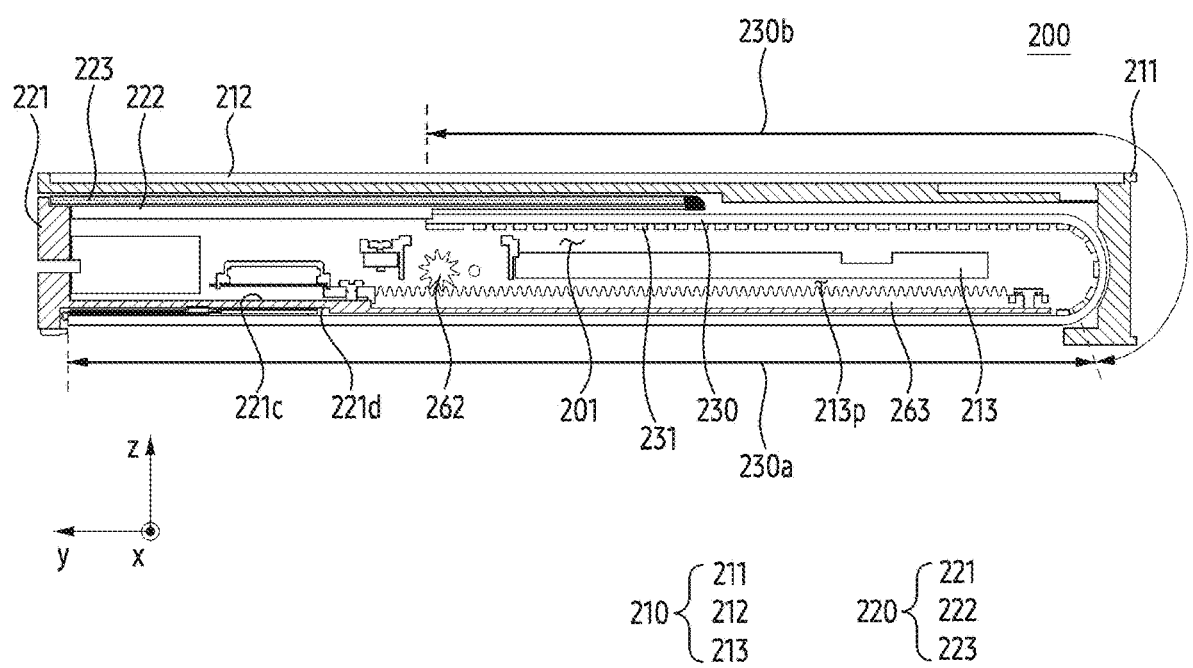
FIG. 3B is a cross-sectional view illustrating an embodiment of the electronic device cut along line A-A' of FIG. 2A.

FIG. 3A is an exploded perspective view of an embodiment of an electronic device. FIG. 3B is a cross-sectional view illustrating an embodiment of the electronic device cut along line A-A' of FIG. 2A.

Referring to FIGS. 3A and 3B, the electronic device 200 in an embodiment may include a first housing 210, a second housing 220, a display 230, a camera 240, a battery 250 (e.g., a battery 189 of FIG. 1) and a driving unit 260. In an embodiment, the first housing 210 and the second housing 220 may be coupled to each other and define an internal space 201 of the electronic device 200. In an embodiment, in a first state of the electronic device 200, a second region 230b of the display 230 may be accommodated in the internal space 201, for example.

In an embodiment, the first housing 210 may include a book cover 211, a rear plate 212, and a frame cover 213. In an embodiment, the book cover 211, the rear plate 212, and the frame cover 213 included in the first housing 210 are coupled with each other, and when the second housing 220 moves relative to the first housing 210, it may not move. In an embodiment, the book cover 211 may form at least a portion of an outer surface of the electronic device 200. In an embodiment, the book cover 211 may form at least the portion of a side of the electronic device 200 and at least the portion of a rear surface of the electronic device 200, for example. In an embodiment, the rear plate 212 may provide a surface on which the rear plate 212 is disposed (e.g., mounted). The rear plate 212 may be disposed (e.g., mounted) on one surface of the book cover 211.

In an embodiment, the frame cover 213 may support internal components of the electronic device 200. In an embodiment, the frame cover 213 may accommodate at least the portion of the battery 250 and the driving unit 260, for example. The battery 250 and the driving unit 260 may be accommodated in at least one of a recess or a hole included in the frame cover 213. In an embodiment, the frame cover 213 may be surrounded by the book cover 211. In an embodiment, in the first state of the electronic device 200, one surface 213a of the frame cover 213 on which the battery 250 is disposed may face the book cover 211 and/or the second region 230b of the display 230, for example. In another embodiment, in the first state of the electronic device 200, an opposite surface 213b of the frame cover 213 opposite the one surface 213a of the frame cover 213 may face a first region 230a of the display 230 or the front cover 221. In an embodiment, the frame cover 213 may include aluminum as a material, for example, but is not limited thereto.

In an embodiment, the second housing 220 may include the front cover 221, a rear cover 222, and a slide cover 223. In an embodiment, the front cover 221, the rear cover 222, and the slide cover 223 may be coupled with each other, and may move together with the second housing 220 when the second housing 220 relatively moves relative to the first housing 210. The front cover 221 may support internal components of the electronic device 200. In an embodiment, a printed circuit board 224 on which electronic components (e.g., a processor 120 of FIG. 1) of the electronic device 200 are disposed and/or the camera 240 may be disposed on one surface 221c of the front cover 221 facing the internal space 201, for example. An opposite surface 221d of the front cover 221 opposite to one surface 221c of the front cover 221 may face the first region 230a of the display 230 when the electronic device 200 is in the first state. In an embodiment, the rear cover 222 may be coupled to the front cover 221, and may protect components of the electronic device 200 disposed on the front cover 221. In an embodiment, the rear cover 222 may cover the portion of one surface 221c of the front cover 221, for example. In an embodiment, the slide cover 223 may be disposed on the rear cover 222, and may form the outer surface of the electronic device 200 together with the rear plate 212 and the book cover 211. The slide cover 223 may be coupled to one surface of the rear cover 222, and may protect the rear cover 222 and/or the front cover 221.

In an embodiment, when the electronic device 200 is in the first state, the display 230 may be bent by at least the portion of the display 230 being rolled into the internal space 201. In an embodiment, the display 230 may cover at least the portion of the frame cover 213 and at least the portion of the front cover 221. In an embodiment, when the electronic device 200 is in the first state, the display 230 may cover the opposite surface 221d of the front cover 221, pass between the front cover 221 and the book cover 211, and extend toward the internal space 201, for example. The display 230 may surround the frame cover 213 after passing between the front cover 221 and the book cover 211. The display 230 may cover one surface 213a of the frame cover 213 in the internal space 201. In an embodiment, when the second housing 220 moves in a first direction, the second region 230b of the display 230 may be slid out from the internal space 201. In an embodiment, as the second housing 220 moves in the second direction, the display 230 may pass between the front cover 221 and the book cover 211 and may be slid out from the internal space 201, for example.

In an embodiment, the electronic device 200 may include a support bar 231 and a guide rail 232 supporting the display 230. In an embodiment, the support bar 231 may include a plurality of bars coupled to each other and may be manufactured in a form corresponding to the form of the second region 230b of the display 230, for example. In an embodiment, as the display 230 moves, the support bar 231 may move together with the display 230. In an embodiment, in the first state in which the second region 230b of the display 230 is wound in the internal space 201, the support bar 231 may be wound in the internal space 201 together with the second region 230b of the display 230. As the second housing 220 moves in the first direction, the support bar 231 may move together with the second region 230b of the display 230. In an embodiment, the guide rail 232 may guide movement of the support bar 231. In an embodiment, as the display 230 moves, the support bar 231 may move along the guide rail 232 coupled to the frame cover 213, for example. In an embodiment, the guide rail 232 may be coupled to the frame cover 213. In an embodiment, the guide rail 232 may be provided in plural so that the plurality of guide rails 232 is spaced apart from each other and disposed at both peripheries of the frame cover 213 spaced apart from each other along a third direction (e.g., +x direction) perpendicular to the first direction, for example.

In an embodiment, the driving unit 260 may provide driving force to the second housing 220 so that the second housing 220 may relatively move relative to the first housing 210. In an embodiment, the driving unit 260 may include a drive motor 261, a pinion gear 262, and a rack gear 263. The drive motor 261 may receive power from the battery 250 and provide driving force to the second housing 220. In an embodiment, the drive motor 261 may be disposed in the first housing 210 and may not move when the second housing 220 moves relative to the first housing 210. In an embodiment, the drive motor 261 may be disposed in the recess defined in the frame cover 213, for example. In an embodiment, the pinion gear 262 may be coupled to the drive motor 261 and may rotate by driving force provided from the drive motor 261. In an embodiment, the rack gear 263 may engage with the pinion gear 262 and may move according to a rotation of the pinion gear 262. In an embodiment, the rack gear 263 may execute linear reciprocation in the first direction or the second direction according to the rotation of the pinion gear 262, for example. In an embodiment, the rack gear 263 may be disposed in the second housing 220. In an embodiment, the rack gear 263 may be coupled to the front cover 221 included in the second housing 220, for example. In an embodiment, the rack gear 263 may be movable inside the operating space 213p defined in the frame cover 213.

In an embodiment, when the pinion gear 262 rotates along a first rotation direction (e.g., clockwise in FIG. 3B), the rack gear 263 may move in the first direction (e.g., +y direction). When the rack gear 263 moves along the first direction, the second housing 220 coupled to the rack gear 263 may move along the first direction. As the second housing 220 moves along the first direction, an area of the display 230 visible from the outside of the electronic device 200 may be expanded. When the pinion gear 262 rotates along the second rotation direction (e.g., counterclockwise in FIG. 3B), the rack gear 263 may move in the second direction (e.g., −y direction). When the rack gear 263 moves along the second direction, the second housing 220 coupled to the rack gear 263 may move along the second direction. As the second housing 220 moves along the second direction, the area of the display 230 visible from the outside of the electronic device 200 may be reduced.

In the above description, it has been described that the drive motor 261 and the pinion gear 262 are disposed in the first housing 210 and the rack gear 263 is disposed in the second housing 220, but the disclosure may not be limited thereto. In embodiments, the drive motor 261 and the pinion gear 262 may be disposed in the second housing 220, and the rack gear 263 may be disposed in the first housing 210.

Figure 4:
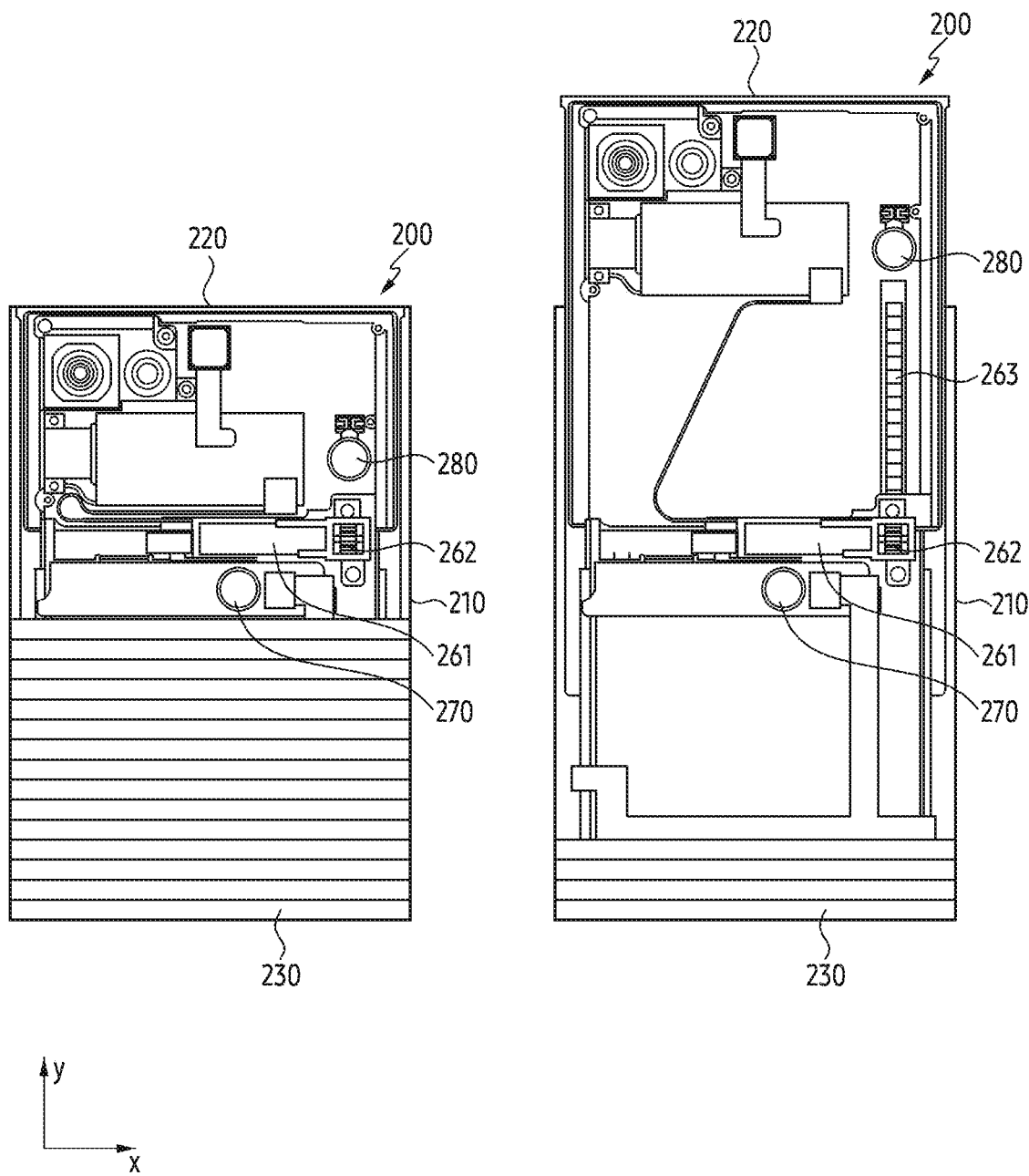
FIG. 4 is a rear view of an embodiment of a first state and a second state of an electronic device.
Figure 5:
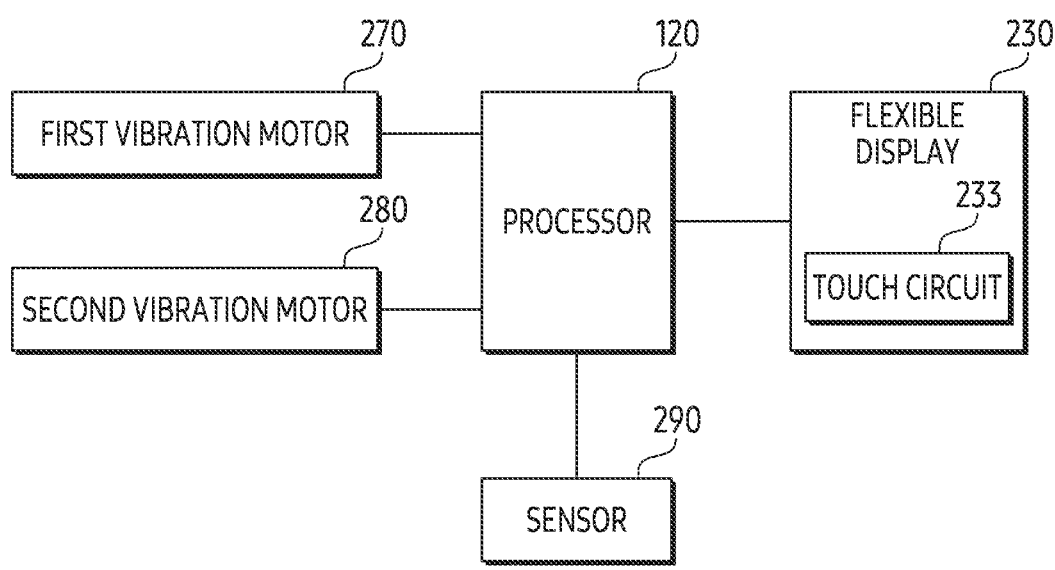
FIG. 5 is a schematic block diagram of an embodiment of an electronic device.

FIG. 4 is a rear view of an embodiment of a first state and a second state of an electronic device. FIG. 5 is a schematic block diagram of an embodiment of an electronic device.

Referring to FIGS. 4 and 5, an electronic device 200 in an embodiment may include a first housing 210, a second housing 220, a flexible display 230, a first vibration motor 270, a second vibration motor 280, a sensor 290, a driving unit 260, a processor 120.

In an embodiment, the second housing 220 may be movably coupled to the first housing 210. In an embodiment, the second housing 220 may be coupled to the first housing 210 to be slidable or rollable, for example. In an embodiment, the second housing 220 may be movably coupled to the first housing 210 in a first direction (e.g., in the +y direction), or in a second direction (e.g., in the −y direction) opposite to the first direction, for example. In an embodiment, the flexible display 230 may be disposed on a surface formed by the first housing 210 and the second housing 220. The flexible display 230 may be capable of sliding-in into the first housing 210 or may be capable of sliding-out from the first housing 210. The first housing 210 may be also referred to as a first housing 210 of FIGS. 2A to 3B. The second housing 220 may be also referred to as a second housing 220 of FIGS. 2A to 3B. The flexible display 230 may be also referred to as a display 230 of FIGS. 2A to 3B. An overlapping description of the first housing 210, the second housing 220, and the display 230 is omitted.

In an embodiment, the state of the electronic device 200 may be defined according to a relative location of the second housing 220 with respect to the first housing 210. In an embodiment, the first state may be also referred to as the state in which the second housing 220 is movable in the first direction of the first direction (e.g., the +y direction) and the second direction (e.g., the −y direction) opposite to the first direction. The second state may mean the state distinguished from the first state. In an embodiment, the second state may mean the state in which a moving distance of the second housing 220 to the first housing 210 is greater than zero and is less than or equal to the maximum moving distance (e.g., a designated distance d2 of FIG. 2C). In an embodiment, the second state may be also referred to as the state in which the second housing 220 is movable in the second direction of the first direction (e.g., the +y direction) and the second direction (e.g., the −y direction) opposite the first direction, for example.

In an embodiment, the first vibration motor 270 and the second vibration motor 280 may mean a device capable of converting an electrical signal into vibration. The vibration may mean a mechanical stimulus that a user may perceive through tactile sensation or motor sensation. The vibration motor is not limited to a device that simply generates vibration, but may mean a device capable of transmitting mechanical stimulation through a medium. The first vibration motor 270 and the second vibration motor 280 may provide vibration to the outside of the electronic device 200 by vibrating.

In an embodiment, the first vibration motor 270 may be disposed in the first housing 210. The second vibration motor 280 may be disposed in the second housing 220. The first vibration motor 270 and the second vibration motor 280 may provide a haptic notification by vibrating. When the processor 120 transmits the electrical signal including an operation request to the first vibration motor 270 and/or the second vibration motor 280, the first vibration motor 270 and/or the second vibration motor 280 may vibrate. In an embodiment, the first vibration motor 270 and the second vibration motor 280 may include a vibrator capable of vibrating according to the electrical signal including the operation request, for example.

In an embodiment, the processor 120 may be operably connected to the first vibration motor 270 and the second vibration motor 280. The processor 120 may control the overall operation of the first vibration motor 270 and the second vibration motor 280. The processor 120 may provide the haptic notification to the user through the first vibration motor 270 and the second vibration motor 280. The processor 120 may receive a touch input for the flexible display. In an embodiment, the processor 120 may receive the touch input through a designated region (e.g., a designated region 230-1 of FIG. 6B) of the flexible display 230, for example. The designated region 230-1 may be a first region (e.g., a first region 230a of FIG. 2C) and/or a second region (e.g., a second region 230b of FIG. 2C) of the display 230, but is not limited thereto. In an embodiment, the designated region 230-1 may mean the region operably connected to a touch sensor configured to sense a touch or a pressure sensor set to measure strength of force generated by the touch, for example. The processor 120 may identify, in response to the received touch input, a distance between a contact point of the touch input and the first vibration motor 270, and a distance between a contact point of the touch input and the second vibration motor 280. The contact point of the touch input may mean the location for receiving a touch position input of the user on the designated region 230-1 of the flexible display 230. The processor 120 may provide the haptic notification for the touch input through the first vibration motor 270 and the second vibration motor 280, based on the identified distance.

In an embodiment, the flexible display 230 may include a touch circuit 233 configured to sense a touch. The processor 120 may sense the touch input to a predetermined location of the designated region 230-1 through the touch circuit 233 and obtain data related to the touch input. In an embodiment, the processor 120 may identify a change in capacitance of the designated region 230-1 through the touch circuit 233, for example. The processor 120 may generate the data signal related to the change in the predetermined location of the designated region 230-1 or capacitance for the predetermined region through the touch circuit 233. However, an operation method related to the touch circuit 233 is not limited thereto. In an embodiment, at least a portion of the touch circuit 233 may be included as the portion of the flexible display 230, or may be included as a portion of another component disposed outside the flexible display 230.

In an embodiment, the processor 120 may detect the moving distance of the second housing 220 through the sensor 290. In an embodiment, the sensor 290 may be a hall sensor disposed in the first housing 210 and capable of identifying magnitude and/or a direction of a magnetic field, and the second housing 220 and/or the flexible display 230 may include a magnetic material (e.g., magnet) that may cause a hall-effect, for example. The processor 120 may detect movement of the second housing through the hall sensor. In an embodiment, the processor 120 may obtain the data related to the change in the magnitude and the direction of the magnetic force according to movement of the magnetic material moving together with the second housing through the hall sensor, for example. In an embodiment, the processor 120 may identify the moving distance of the second housing 220 to the first housing 210 based on the change in the magnetic field formed by the magnetic material disposed in the second housing 220 and/or flexible display 230 through the hall sensor, for example. The location of the hall sensor and the magnetic material are not limited thereto, and the hall sensor may be disposed in the second housing 220, and the magnetic material may be disposed in the first housing 210.

In an embodiment, the driving unit 260 may provide driving force to the second housing 220 so that the second housing 220 may relatively move relative to the first housing 210. In an embodiment, the driving unit 260 may include a drive motor 261, a pinion gear 262, and a rack gear 263. The drive motor 261 may provide driving force to the second housing 220. The pinion gear 262 may be coupled to the drive motor 261 and may be rotatable by driving force provided from the drive motor 261. The rack gear 263 may engage with the pinion gear 262 and may execute linear reciprocation according to the rotation of the pinion gear 262. The driving unit 260 may be also referred to as a driving unit 260 of FIG. 3A. In an embodiment, the second vibration motor 280 may be spaced apart from the rack gear in the first direction (e.g., +y direction). Vibration provided from the second vibration motor 280 may be transmitted to the first housing 210 through the rack gear 263.

A relative size of the electronic device 200 in the first state in an embodiment may be smaller than the relative size of the electronic device 200 in the second state. In the case of the electronic device 200 in the first state, vibration generated from the first vibration motor 270 may be relatively uniformly transmitted to the entirety of the designated region 230-1. In the case of the electronic device 200 in the second state, since the relative size is large, vibration transmitted from the first vibration motor 270 may vary according to the distance to the first vibration motor 270 in the designated region 230-1. In an embodiment, an intensity of vibration by the first vibration motor 270 transmitted to a point relatively far from the first vibration motor 270 may be less than the intensity of vibration by the first vibration motor 270 transmitted to a point relatively close to the first vibration motor 270, for example. In case that the user uses the electronic device 200 in the second state, vibration sensitivity felt by the user at the different location in the designated region 230-1 may be different from each other. Hereinafter, various embodiments may include operations of the processor 120 for controlling the first vibration motor 270 and the second vibration motor 280 to provide substantially the uniform vibration in the entirety of the designated region 230-1.

Figure 6A:
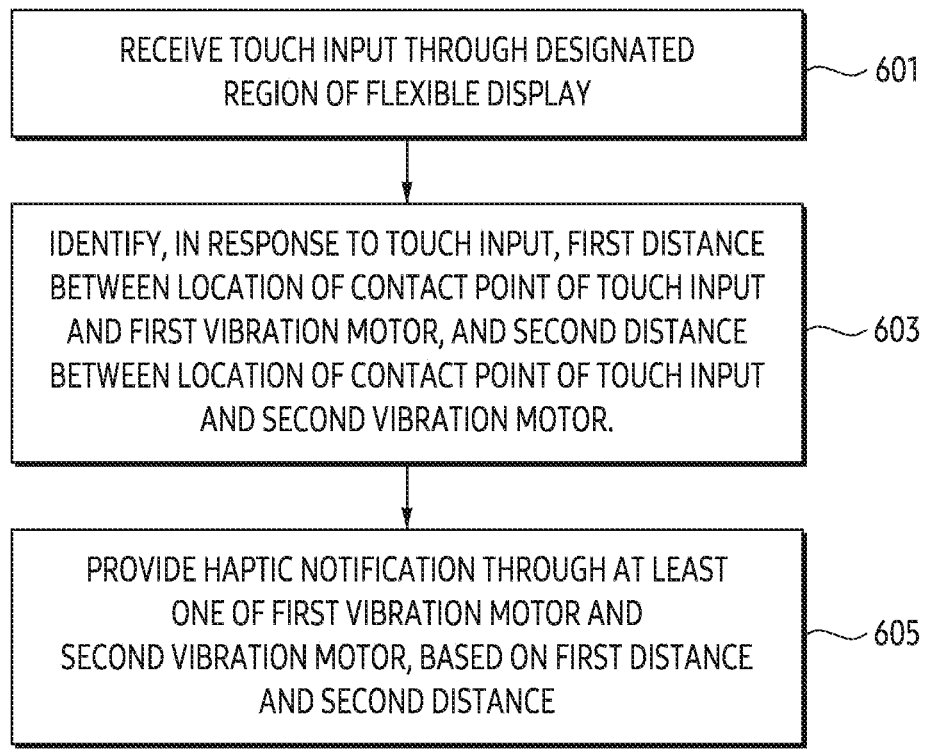
FIG. 6A is a flowchart indicating an embodiment of providing a haptic notification according to a touch input of an electronic device.
Figure 6B:
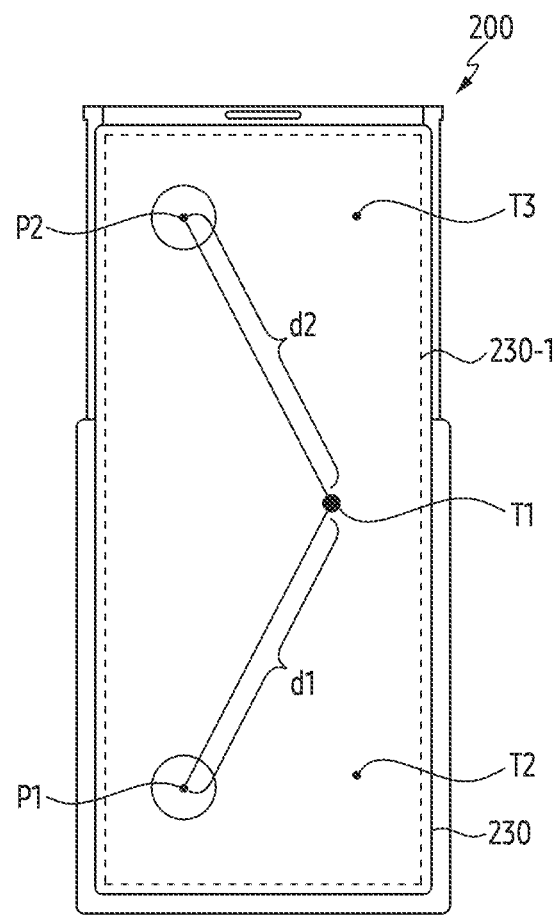
FIG. 6B indicates an embodiment of a touch input to a designated region of an electronic device.

FIG. 6A is a flowchart indicating an embodiment of providing a haptic notification according to a touch input of an electronic device. FIG. 6B indicates an embodiment of a touch input to a designated region of an electronic device.

Referring to FIG. 6A, in operation 601, a processor (e.g., a processor 120 of FIG. 5) may receive the touch input through the designated region (e.g., a designated region 230-1 of FIG. 6B) of a flexible display 230.

In an embodiment, the processor 120 may receive the touch input through the designated region 230-1 of the flexible display 230. In an embodiment, the touch input may mean a user input provided by the user to the designated region 230-1 to control the electronic device 200, for example. The touch input may include a tap, a double tap, a press (touch and hold), a pan, a swipe, a flick, a drag, a pinch-in/out, and a rotation operation for the designated region 230-1. In an embodiment, a touch circuit 233 (e.g., a touch circuit 233 of FIG. 5) may detect a change in capacitance of the designated region 230-1. The change in capacitance may mean the change in capacitance of each of signal patterns included in the touch circuit 233. The processor 120 may receive the touch input through the touch circuit 233, based on sensing data related to the touch input. The sensing data may include capacitance change values of each of signal patterns. The processor 120 may identify the touch input for designated region 230-1 through data related to the touch input.

In operation 603, the processor 120 may identify, in response to the touch input, a first distance d1 between a location of a contact point of the touch input and a first vibration motor 270, and a second distance d2 between a location of a contact point of the touch input and a second vibration motor 280.

Referring to FIG. 6B, the processor 120 may identify the location of the contact point of the touch input through a preset coordinate in the entirety of the designated region 230-1. The processor 120 may identify the location of the contact point of the touch input based on the sensing data received from the touch circuit 233. The sensing data may include the data capable of identifying the location of change in capacitance. The unique coordinate may be preset for each pixel forming the designated region 230-1. The processor 120 may identify the location of the contact point by matching the coordinate to the touch input based on the sensing data received through the touch circuit 233. However, location identification of the contact point is not limited to being identified through the coordinate of the designated region 230-1. In another embodiment, the processor 120 may identify a first angle of a line segment connected from the location of the first vibration motor 270 to the contact point of the touch input and a second angle of the line segment connected from the location of the second vibration motor 280 to the contact point of the touch input, based on the line segment formed by the first vibration motor 270 and the second vibration motor 280. The processor 120 may obtain the location of the contact point of the touch input based on the identified first angle and the second angle.

In an embodiment, the processor 120 may identify a first distance d1 and a second distance d2 based on the identified location of the contact point. In an embodiment, the processor 120 may identify the first distance d1 and the second distance d2 based on the location of the first vibration motor 270 and the location of the second vibration motor 280 in the first state or the second state and the location of the contact point, for example. The first distance d1 may mean a linear distance from the location corresponding to the location of the first vibration motor 270 in the designated region 230-1 to the location of the contact point. The second distance d2 may mean the linear distance from the location corresponding to the location of the second vibration motor 280 in the designated region 230-1 to the location of the contact point. Referring to FIG. 6B, the location corresponding to the location of the first vibration motor 270 among the designated region 230-1 may be a center of the region overlapping the first vibration motor 270 when the designated region 230-1 is viewed from above, and the location corresponding to the location of the second vibration motor 280 among the designated region 230-1 may be the center of the region overlapping the first vibration motor 270 when the designated region 230-1 is viewed from above. The processor 120 may calculate the first distance d1 by calculating the linear distance between the coordinate of the location corresponding to the location of the first vibration motor 270 among the designated region 230-1 and the coordinate of the location of the contact point, and may calculate the second distance d2 by calculating the linear distance between the coordinate of the location corresponding to the location of the second vibration motor 280 among the designated region 230-1 and the coordinate of the location of the contact point. However, the processor 120 is not limited to the above-described method, and may identify the first distance d1 and the second distance d2 through the first angle and the second angle.

In operation 603, the processor 120 may provide the haptic notification through at least one of a first motor and a second motor, based on the first distance d1 and the second distance d2.

In an embodiment, the processor 120 may provide the haptic notification for a touch input through the first vibration motor 270 and the second vibration motor 280, based on identifying the first distance d1 less than a reference distance and the second distance d2 less than the reference distance. The reference distance may mean the distance from the location of the first vibration motor 270 or the second vibration motor 280 to a boundary at which an intensity of vibration by the first vibration motor 270 or the second vibration motor 280 may be transmitted at a predetermined intensity or more. The reference distance may be predetermined based on the intensity of vibration of the vibration motors 270 and 280. In an embodiment, in case that the vibration intensity of vibration motors is relatively large, the reference distance may be greater than the reference distance in case that the vibration intensity of vibration motors is relatively small, for example. A first location T1 illustrated in FIG. 6B may be the location spaced apart from the first vibration motor 270 by the first distance d1 less than the reference distance, and spaced apart from the second vibration motor 280 by the second distance d2 less than the reference distance. The first location T1 may be a location in the region in which the region disposed in the reference distance from the location P1 corresponding to the location of the first vibration motor 270 among the designated region 230-1 overlaps the region disposed in the reference distance from the location P2 corresponding to the location of the second vibration motor 280 among the designated region 230-1 each other. The first location T1 may be the location at which vibration by the first vibration motor 270 may be transmitted more than equal to the intensity of a designated vibration, and vibration by the second vibration motor 280 may be transmitted more than equal to the intensity of the designated vibration. The processor 120 may provide a haptic notification by controlling the first vibration motor 270 and the second vibration motor 280 to vibrate in response to identifying that the location of the contact point is the first location T1.

In an embodiment, the processor 120 may provide the haptic notification through the first vibration motor 270 of the first vibration motor 270 and the second vibration motor 280, based on identifying the first distance d1 less than the reference distance and the second distance d2 greater than or equal to the reference distance. The second location T2 illustrated in FIG. 6B may be disposed at the first distance d1 less than the reference distance and the second distance d2 greater than or equal to the reference distance. The second location T2 may be the location in the region in which the region disposed in the reference distance from the location corresponding to the location of the first vibration motor 270 among the designated region 230-1 overlaps the region disposed outside the reference distance from the location corresponding to the location of the second vibration motor 280 among the designated region 230-1 each other. The second location T2 may be the location at which vibration by the first vibration motor 270 may be transmitted more than equal to the intensity of the designated vibration, and vibration by the second vibration motor 280 may not be transmitted more than equal to the intensity of the designated vibration. In case that the user touches the second location T2, even when both the first vibration motor 270 and the second vibration motor 280 provide vibration, only the haptic notification by the first vibration motor 270 may be substantially recognized. In an embodiment, in case that the first vibration motor 270 and the second vibration motor 280 are driven at the same time, magnitude of the vibration transmitted to the second location T2 may be substantially the same as the magnitude of the vibration transmitted to the second location T2 in case that the first vibration motor 270 is driven, for example. The processor 120 may provide the haptic notification by controlling the first vibration motor 270 to vibrate in response to identifying that the location of the contact point is the second location T2.

In an embodiment, the processor 120 may provide the haptic notification through the second vibration motor 280 of the first vibration motor 270 and the second vibration motor 280, based on identifying the first distance d1 greater than or equal to the reference distance and the second distance d2 less than the reference distance. A third location T3 illustrated in FIG. 6B may be disposed at the first distance d1 greater than or equal to the reference distance and the second distance d2 less than the reference distance. The third location T3 may be the location in the region in which the region disposed outside the reference distance from the location corresponding to the location of the first vibration motor 270 among the designated region 230-1 overlaps the region disposed in the reference distance from the location corresponding to the location of the second vibration motor 280 among the designated region 230-1 each other. The third location T3 may be the location at which vibration by the second vibration motor 280 may be transmitted more than equal to the intensity of the designated vibration, and vibration by the first vibration motor 270 may not be transmitted more than equal to the intensity of the designated vibration. In case that the user touches the third location T3, even when both the first vibration motor 270 and the second vibration motor 280 provide vibration, only the haptic notification by the second vibration motor 280 may be substantially recognized. In an embodiment, in case that the first vibration motor 270 and the second vibration motor 280 are driven at the same time, the magnitude of the vibration transmitted to the third location T3 may be substantially the same as the magnitude of the vibration transmitted to the third location T3 in case that the second vibration motor 280 is driven, for example. The processor 120 may provide the haptic notification by controlling the second vibration motor 280 to vibrate in response to identifying that the location of the contact point is the third location T3.

In an embodiment, the processor 120 may provide the haptic notification of the substantially uniform intensity of vibration in the entirety of the designated region 230-1, and may reduce unnecessary power consumption when providing the haptic notification, by operating at least one of the first vibration motor 270 and the second vibration motor 280 based on the first distance d1 and the second distance d2. In an embodiment, in case of identifying the touch input for the first location T1, the processor 120 may provide vibration of the constant intensity to the first location T1 by adjusting the intensity of the vibration of the first vibration motor 270 and the intensity of the vibration of the second vibration motor 280 when providing the haptic notification using the first vibration motor 270 and the second vibration motor 280, for example. In case of identifying the touch input for the second location T2 or the third location T3, the processor 120 may provide vibration of the constant intensity to the second location T2 or the third location T3, and may prevent the vibration motor from operating unnecessarily, by operating the first vibration motor 270 or the second vibration motor 280.

Figure 7A:
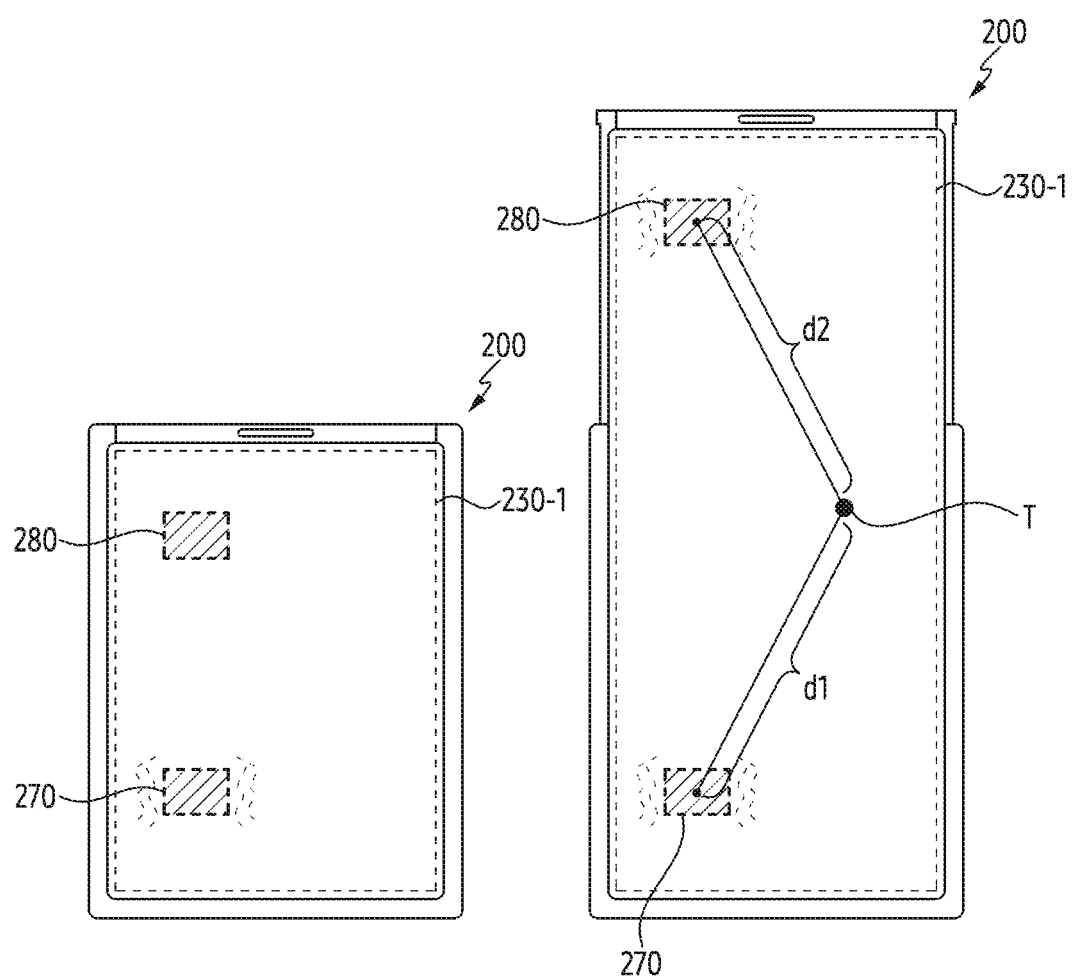
FIG. 7A indicates an embodiment in which a first vibration motor and a second vibration motor operate based on a state of an electronic device.
Figure 7B:
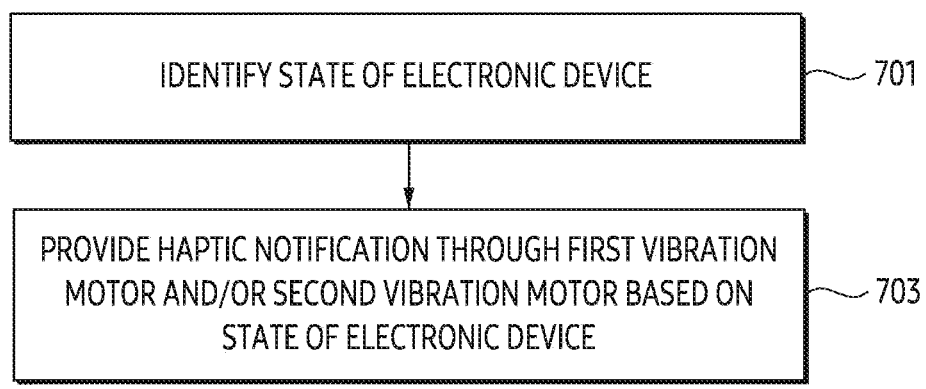
FIG. 7B is a flowchart indicating an embodiment of providing a haptic notification based on a state of an electronic device.

FIG. 7A indicates an embodiment in which a first vibration motor and a second vibration motor operate based on a state of an electronic device. FIG. 7B is a flowchart indicating an embodiment of providing a haptic notification based on a state of an electronic device.

Referring to 7A, a processor (e.g., a processor 120 of FIG. 5) may control a first vibration motor 270 and a second vibration motor 280 based on a state of an electronic device 200. In an embodiment, the processor 120 may provide the haptic notification through the first vibration motor 270 in the first state, and may provide the haptic notification through the first vibration motor 270 and the second vibration motor 280 in a second state.

Referring to FIG. 7B, in operation 701, the processor 120 may identify a moving distance of a second housing 220 through a sensor 290 (e.g., a sensor 290 of FIG. 5). In an embodiment, the processor 120 may obtain data on magnitude and/or a direction of a magnetic field by a magnetic material disposed on the second housing 220 and/or a flexible display 230 through the sensor 290, and identify the moving distance of the second housing 220 based on the obtained the data on the magnetic field, for example. The sensor 290 may transmit sensing data on the moving distance of the second housing 220 to the processor 120.

In an embodiment, the processor 120 may identify the state of the electronic device 200 through the sensor 290. In an embodiment, the processor 120 may compare the sensing data obtained through the sensor 290 with reference data corresponding to the first state and the second state, for example. In case that the sensing data is in a range of the reference data corresponding to the first state, the processor 120 may identify that the state of the electronic device 200 is the first state. The reference data corresponding to the first state may be the data indicating the state in which the second housing 220 is slid-in based on the first housing 210. The reference data corresponding to the second state may be the data indicating the state in which the second housing 220 is slid out based on the first housing 210. In the first state, since the distance between a magnet disposed in the first housing 210 and the sensor 290 disposed in the second housing 220 is the shortest distance, the magnitude of the magnetic field obtained through the sensor 290 may be in a first range. In the second state, since the second housing 220 is slid out from the first housing 210, in the second state, the distance between the magnet disposed in the first housing 210 and the sensor 290 disposed in the second housing 220 may be greater than the distance between the magnet and the sensor 290 in the first state. In the second state, the magnitude of the magnetic field obtained through the sensor 290 may be in a second range. The magnitude of the magnetic field included in the first range may be greater than the magnitude of the magnetic field included in the second range. In case that the data is in the first range corresponding to the first state, the processor 120 may identify that the state of the electronic device 200 is the first state. In case that the data is in the second range corresponding to the second state, the processor 120 may identify that the state of the electronic device 200 is the second state.

In operation 703, the processor 120 may provide the haptic notification through the first vibration motor 270 and/or the second vibration motor 280 based on the state of the electronic device 200.

In an embodiment, the processor 120 may provide the haptic notification through the first vibration motor 270 or the second vibration motor 280 in response to identifying the state of the electronic device 200 as the first state. In an embodiment, referring to FIG. 7A, the processor 120 may provide the haptic notification through the first vibration motor 270 or the second vibration motor 280 in the first state, for example. Since in the first state, the overall size of the electronic device 200 is relatively small, an intensity of vibration transmitted from the first vibration motor 270 and the second vibration motor 280 to a location of a contact point may be substantially constant throughout a designated region 230-1. The processor 120 may reduce unnecessary power consumption by providing the haptic notification through only one vibration motor of the first vibration motor 270 and the second vibration motor 280.

In an embodiment, the processor 120 may adjust the intensity of vibration of the second vibration motor 280 based on the state of the electronic device 200. In an embodiment, in the first state, the intensity of vibration of the second vibration motor 280 for transmitting the haptic notification to the contact point through the second vibration motor 280 may be less than the intensity of vibration of the second vibration motor 280 for transmitting the haptic notification to the contact point through the second vibration motor 280 in the second state distinguished from the first state. In the first state, since the overall size of the electronic device 200 is relatively small, even when the intensity of vibration of the second vibration motor 280 is relatively small, the haptic notification may be sufficiently transmitted to the contact point.

In an embodiment, the processor 120 may provide the haptic notification through the first vibration motor 270 or the second vibration motor 280 based on identifying the state of the electronic device 200 as the second state. Since in the second state, the overall size of the electronic device 200 is relatively large, the intensity of vibration transmitted from the first vibration motor 270 and the second vibration motor 280 to the location T of the contact point may vary depending on the location T of the contact point. The processor 120 may identify the first distance d1 and the second distance d2, and provide the haptic notification through at least one of the first vibration motor 270 and/or the second vibration motor 280 based on the identified first distance d1 and the second distance d2. In an embodiment, referring to FIG. 7A, the processor 120 may provide the haptic notification for the touch input through the first vibration motor 270 and the second vibration motor 280, based on identifying the first distance d1 less than the reference distance and the second distance d2 less than the reference distance, for example.

Figure 8A:
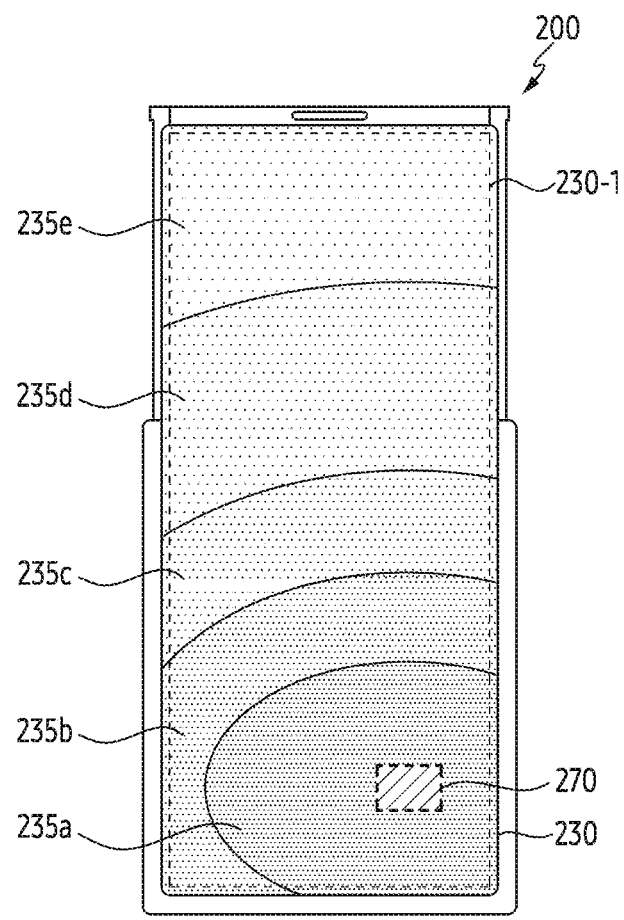
FIG. 8A indicates an embodiment of a plurality of first regions of an electronic device.
Figure 8B:
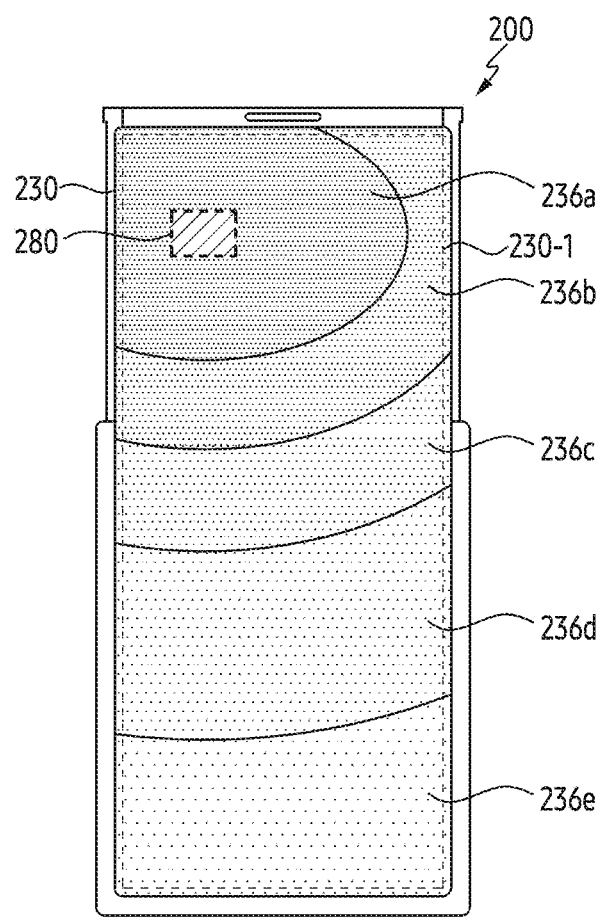
FIG. 8B indicates an embodiment of a plurality of second regions of an electronic device.
Figure 8C:
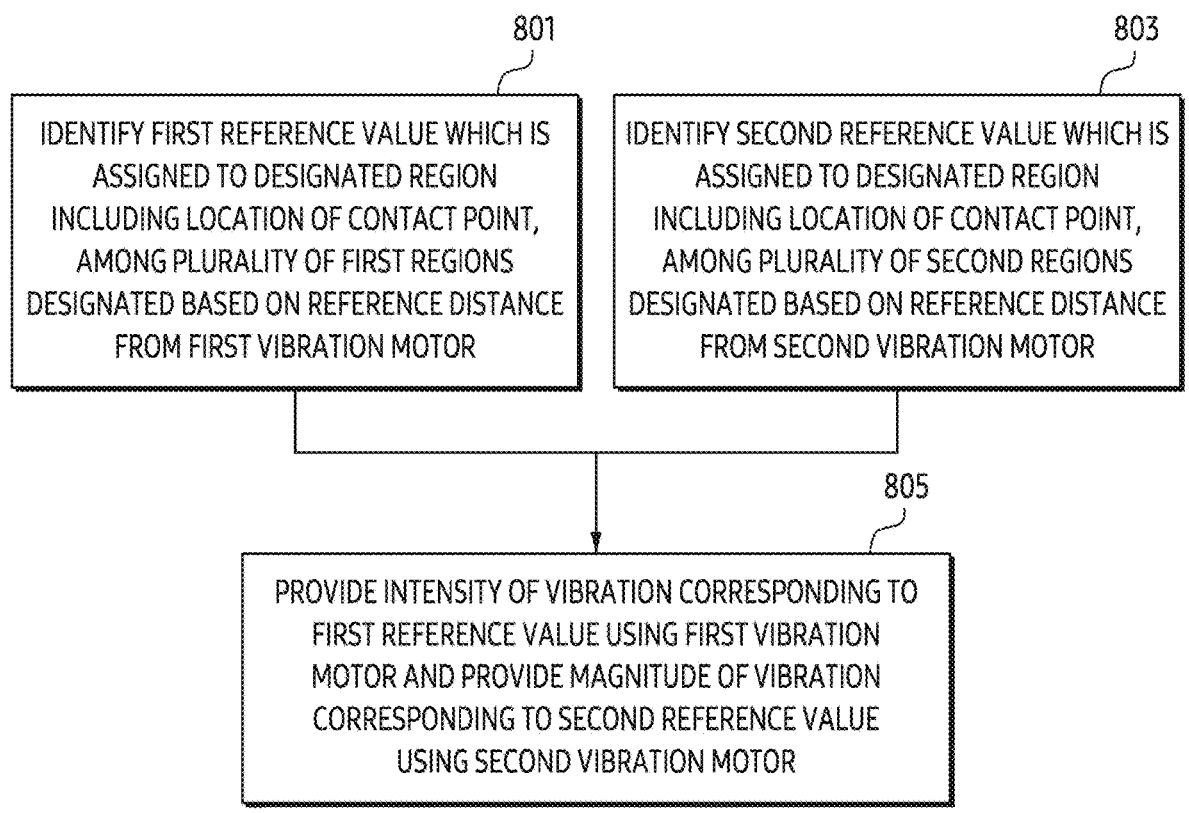
FIG. 8C is a flowchart indicating an embodiment of providing a haptic notification according to a touch location of an electronic device.

FIG. 8A indicates an embodiment of a plurality of first regions of an electronic device. FIG. 8B indicates an embodiment of a plurality of second regions of an electronic device. FIG. 8C is a flowchart indicating an embodiment of providing a haptic notification according to a touch location of an electronic device.

Referring to FIG. 8A, a designated region 230-1 of a flexible display 230 may be designated as a plurality of first regions 235a, 235b, 235c, 235d, and 235e. In an embodiment, the plurality of first regions 235a, 235b, 235c, 235d, and 235e may be designated based on a reference distance from a first vibration motor 270. The plurality of first regions 235a, 235b, 235c, 235d, and 235e may be regions designated according to an intensity of vibration transmitted from the first vibration motor 270 in the designated region 230-1. When vibration generated by the first vibration motor 270 is transmitted through the designated region 230-1, the intensity of vibration may decrease as vibration moves away from a location corresponding to the location of the first vibration motor 270 among the designated region 230-1. According to a rate at which the intensity of the vibration transmitted from the first vibration motor 270 to the designated region 230-1 is decreased, the region in which the intensity of vibration recognized by a user varies may be formed. In an embodiment, the electronic device 200 may include an acceleration sensor capable of identifying vibration of the electronic device 200, for example. The acceleration sensor may generate a signal including the data on the intensity of the vibration through the intensity of the vibration transmitted from the first vibration motor 270 to the designated region 230-1, and may transmit the generated signal to a processor (e.g., a processor 120 of FIG. 5). The processor 120 may designate the plurality of first regions 235a, 235b, 235c, 235d, and 235e based on the signal received from the acceleration sensor.

Referring to FIG. 8A, the designated region 230-1 may be designated as a first sub-region 235a, a second sub-region 235b, a third sub-region 235c, a fourth sub-region 235d, and a fifth sub-region 235e. The intensity of vibration by the first vibration motor 270 transmitted to the first sub-region 235a may be greater than the intensity of vibration of the remaining regions 235b, 235c, 235d, and 235e. The intensity of vibration by the first vibration motor 270 transmitted to the fifth sub-region 235e may be smaller than the intensity of vibration of the remaining regions 235a, 235b, 235c, and 235d. Between the first sub-region 235a and the fifth sub-region 235e, based on the reference distance, the second sub-region 235b, the third sub-region 235c, and the fourth sub-region 235d may be designated. The plurality of first regions 235a, 235b, 235c, 235d, and 235e are only exemplary and are not limited thereto.

In an embodiment, reference values indicating the intensity of vibration to be provided through the first vibration motor 270 may be assigned to each of the plurality of first regions 235a, 235b, 235c, 235d, and 235e. The plurality of the reference values indicating the intensity of vibration to be provided through the first vibration motor 270 assigned to the plurality of first regions 235a, 235b, 235c, 235d, and 235e may correspond to a first distance. As the distance from the first vibration motor 270 increases, each reference value assigned to the plurality of first regions 235a, 235b, 235c, 235d, and 235e may increase. Since the plurality of first regions 235a, 235b, 235c, 235d, and 235e are designated based on the intensity of vibration transmitted from the first vibration motor 270, the transmission intensity of vibration by the first vibration motor 270 may be weaker as they move away from the first vibration motor 270. In an embodiment, the intensity of vibration of the first vibration motor 270 transmitted to the third sub-region 235c may be weaker than the intensity of vibration of the first vibration motor 270 transmitted to the second sub-region 235b, for example. In an embodiment, the plurality of the reference values may be proportional to the first distance so that the intensity of vibration by the first vibration motor 270 may be substantially constantly transmitted to the entirety of the designated region 230-1. In an embodiment, the reference value assigned to the third sub-region 235c may be greater than the reference value assigned to the second sub-region 235b, for example. A difference between the reference value assigned to the third sub-region 235c and the reference value assigned to the second sub-region 235b may be designated based on the difference between the intensity of vibration of the first vibration motor 270 transmitted to the third sub-region 235c and the intensity of vibration of the first vibration motor 270 transmitted to the second sub-region 235b when the first vibration motor 270 provides a constant intensity of vibration.

Referring to FIG. 8B, the designated region 230-1 of the flexible display 230 may be designated as the plurality of second regions 236a, 236b, 236c, 236d, and 236e. The plurality of second regions 236a, 236b, 236c, 236d, and 236e may be designated independently of the plurality of first regions 235a, 235b, 235c, 235d, and 235e. In an embodiment, the plurality of second regions 236a, 236b, 236c, 236d, and 236e may be designated based on the reference distance from the second vibration motor 280. The plurality of second regions 236a, 236b, 236c, 236d, and 236e may be regions designated according to the intensity of vibration transmitted from the second vibration motor 280 in the designated region 230-1. When vibration generated by the second vibration motor 280 is transmitted through the designated region 230-1, the intensity of vibration may decrease as vibration moves away from the location corresponding to the location of the second vibration motor 280 among the designated region 230-1. According to the rate at which the intensity of the vibration transmitted from the second vibration motor 280 to the designated region 230-1 is decreased, the region in which the intensity of vibration recognized by the user varies may be formed. Referring to FIG. 8B, the designated region 230-1 may be designated as a sixth sub-region 236a, a seventh sub-region 236b, an eighth sub-region 236c, a ninth sub-region 236d, and a tenth sub-region 236e. The intensity of vibration by the second vibration motor 280 transmitted to the sixth sub-region 236a may be greater than the intensity of vibration of the remaining regions 236b, 236c, 236d, and 236e. The intensity of vibration by the second vibration motor 280 transmitted to the tenth sub-region 236e may be smaller than the intensity of vibration of the remaining regions 236a, 236b, 236c, and 236d. Between the sixth sub-region 236a and the tenth sub-region 236e, based on the reference distance, the seventh sub-region 236b, the eighth sub-region 236c, and the ninth sub-region 236d may be designated. The plurality of second regions 236a, 236b, 236c, 236d, and 236e are only exemplary and are not limited thereto.

In an embodiment, the reference values indicating the intensity of vibration to be provided through the second vibration motor 280 may be assigned to each of the plurality of second regions 236a, 236b, 236c, 236d, and 236e. The plurality of the reference values indicating the intensity of vibration to be provided through the second vibration motor 280 assigned to the plurality of second regions 236a, 236b, 236c, 236d, and 236e may correspond to a second distance. As the distance from the second vibration motor 280 increases, each reference value assigned to the plurality of second regions 236a, 236b, 236c, 236d, and 236e may increase. Since the plurality of second regions 236a, 236b, 236c, 236d, and 236e are designated based on the intensity of vibration transmitted from the second vibration motor 280, the transmission intensity of vibration by the second vibration motor 280 may be weaker as they move away from the second vibration motor 280. In an embodiment, the intensity of vibration of the second vibration motor 280 transmitted to the eighth sub-region 236c may be weaker than the intensity of vibration of the second vibration motor 280 transmitted to the seventh sub-region 236b, for example. In an embodiment, the plurality of the reference values may be proportional to the second distance so that the intensity of vibration by the second vibration motor 280 may be substantially constantly transmitted to the entirety of the designated region 230-1. In an embodiment, the reference value assigned to the eighth sub-region 236c may be greater than the reference value assigned to the seventh sub-region 236b, for example. The difference between the reference value assigned to the eighth sub-region 236c and the reference value assigned to the seventh sub-region 236b may be designated based on the difference between the intensity of vibration of the second vibration motor 280 transmitted to the eighth sub-region 236c and the intensity of vibration of the second vibration motor 280 transmitted to the seventh sub-region 236b when the second vibration motor 280 provides a constant intensity of vibration.

Referring to FIG. 8C, in operation 801, the processor 120 may identify a first reference value which is assigned to the designated region 230-1 including the location of the contact point among the plurality of first regions 235a, 235b, 235c, 235d, 235e set based on the reference distance from the first vibration motor 270.

In an embodiment, when receiving a touch input, the processor 120 may identify the location of the contact point of the touch input. In an embodiment, the processor 120 may obtain data on the location of the contact point of the touch input in the designated region 230-1 through a touch circuit 233 (e.g., a touch circuit 233 of FIG. 5), for example. The data may include coordinate the data on the contact point for which the touch input is identified among the coordinate designated in the designated region 230-1, or the data on a first angle and a second angle identified by the location of the first vibration motor 270, the second vibration motor 280, and the contact point, but is not limited thereto.

In an embodiment, the processor 120 may receive the signal and identify the designated region 230-1 including the location of the contact point of the touch input among the plurality of first regions 235a, 235b, 235c, 235d, and 235e through the received signal. The processor 120 may identify the first reference value assigned to the designated region 230-1 including the location of the contact point among the plurality of first regions 235a, 235b, 235c, 235d, and 235e. In an embodiment, when the touch input is made to the third sub-region 235c, the processor 120 may identify the third sub-region 235c including the location of the contact point of the touch input through the touch circuit 233, for example. The processor 120 may identify the first reference value assigned to the third sub-region 235c including the location of the identified contact point among the plurality of first regions 235a, 235b, 235c, 235d, and 235e.

In operation 803, the processor 120 may identify the second reference value which is assigned to the designated region 230-1 including the location of the contact point among the plurality of second regions 236a, 236b, 236c, 236d, and 236e set based on the reference distance from the second vibration motor 280.

In an embodiment, when receiving the touch input, the processor 120 may identify the location of the contact point of the touch input. In an embodiment, the processor 120 may obtain the data on the location of the contact point of the touch input in the designated region 230-1 through the touch circuit 233 (e.g., a touch circuit 233 of FIG. 5). The data may include coordinate the data on the contact point for which the touch input is identified among the coordinate designated in the designated region 230-1, or the data on the first angle and the second angle identified by the location of the first vibration motor 270, the second vibration motor 280, and the contact point, but is not limited thereto.

In an embodiment, the processor 120 may receive the signal and identify the designated region 230-1 including the location of the contact point of the touch input among the plurality of second regions 236a, 236b, 236c, 236d, 236e through the received signal. The processor 120 may identify the second reference value assigned to the designated region 230-1 including the location of the contact point among the plurality of second regions 236a, 236b, 236c, 236d, 236e. In an embodiment, when the touch input is made to the eighth sub-region 236c, the processor 120 may identify the eighth sub-region 236c including the location of the contact point of the touch input through the touch circuit 233, for example. The processor 120 may identify the second reference value assigned to the eighth sub-region 236c including the location of the identified contact point among the plurality of second regions 236a, 236b, 236c, 236d, 236e.

In operation 805, the processor 120 may provide the intensity of vibration corresponding to the first reference value using the first vibration motor 270 and provide the intensity of vibration corresponding to the second reference value using the second vibration motor 280. When the first reference value and the second reference value according to the location of the contact point are identified, the processor 120 may transmit the signal related to the first reference value to the first vibration motor 270 and transmit the signal related to the second reference value to the second vibration motor 280. The processor 120 may provide the haptic notification through the first vibration motor 270, by providing the intensity of vibration corresponding to the first reference value. The processor 120 may provide the haptic notification through the second vibration motor 280, by providing the intensity of vibration corresponding to the second reference value. To the location of the contact point of the touch input, the intensity of the vibration corresponding to the first reference value may be provided using the first vibration motor 270, and the intensity of the vibration corresponding to the second reference value may be provided using the second vibration motor 280. In an embodiment, in case that the user inputs the touch input with a finger, the user may recognize the intensity of the vibration obtained by adding the intensity of the vibration corresponding to the first reference value by the first vibration motor 270 and the intensity of the vibration corresponding to the second reference value by the second vibration motor 280, for example.

In an embodiment, since the first reference value is assigned according to the distance between the location of the contact point and the first vibration motor 270, and the second reference value is assigned according to the distance between the location of the contact point and the second vibration motor 280, the first vibration motor 270 and the second vibration motor 280 may provide vibration of substantially constant vibration intensity in the entirety of the region of the designated region 230-1. In an embodiment, in case that the distance between the location of the contact point and the first vibration motor 270 is relatively closer than the distance between the location of the contact point and the second vibration motor 280, the first reference value may be relatively small and the second reference value may be relatively large due to the location of the contact point, for example. In another embodiment, in case that the distance between the location of the contact point and the first vibration motor 270 is relatively farther than the distance between the location of the contact point and the second vibration motor 280, the first reference value may be relatively large and the second reference value may be relatively small due to the location of the contact point.

In an embodiment, in case that the touch input is performed at the predetermined location, the location of the contact point of the touch input may be included in the fourth sub-region 235d of the plurality of first regions 235a, 235b, 235c, 235d, and 235e, and at the same time, the location of the contact point of the touch input may be included in the seventh sub-region 236b of the plurality of second regions 236a, 236b, 236c, 236d, and 236e, for example. In the above-described case, the first reference value may be determined by the reference value assigned to the fourth sub-region 235d, and the second reference value may be determined by the reference value assigned to the seventh sub-region 236b. Since the fourth sub-region 235d is relatively far from the first vibration motor 270, the first reference value may be relatively large, and the seventh sub-region 236b may be relatively close to the second vibration motor 280, the second reference value may be relatively small. The processor 120 may provide the intensity of vibration corresponding to the first reference value through the first vibration motor 270 and provide the intensity of vibration corresponding to the second reference value through the second vibration motor 280. Each of the first reference value and the second reference value may be determined according to the region including the contact point among the plurality of first regions and the plurality of second regions including the location of the contact point. By the first reference value and the second reference value determined based on the location of the contact point, the processor 120 may provide vibration of substantially constant intensity vibration to each location within the designated region 230-1.

Figure 9A:
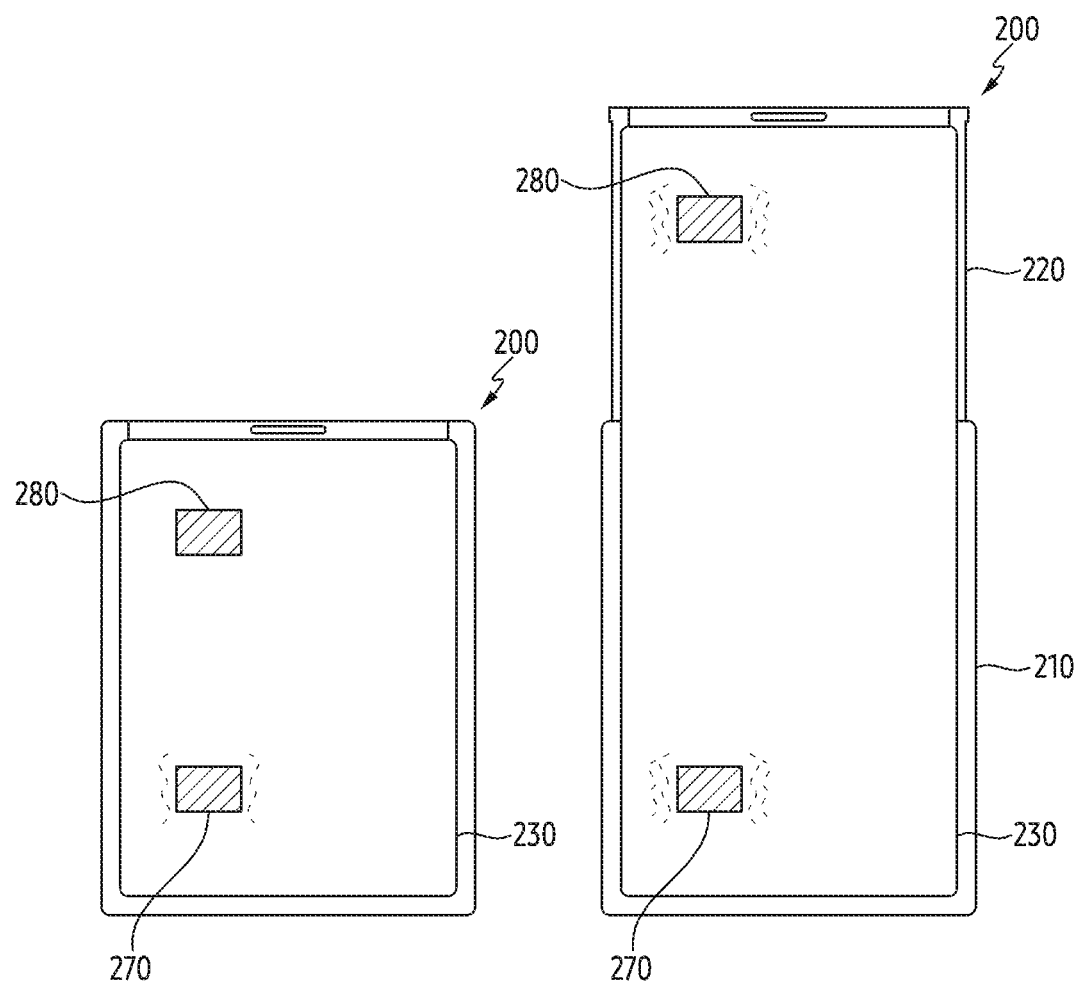
FIG. 9A indicates an embodiment in which a first vibration motor and a second vibration motor operate based on a state of an electronic device.
Figure 9B:
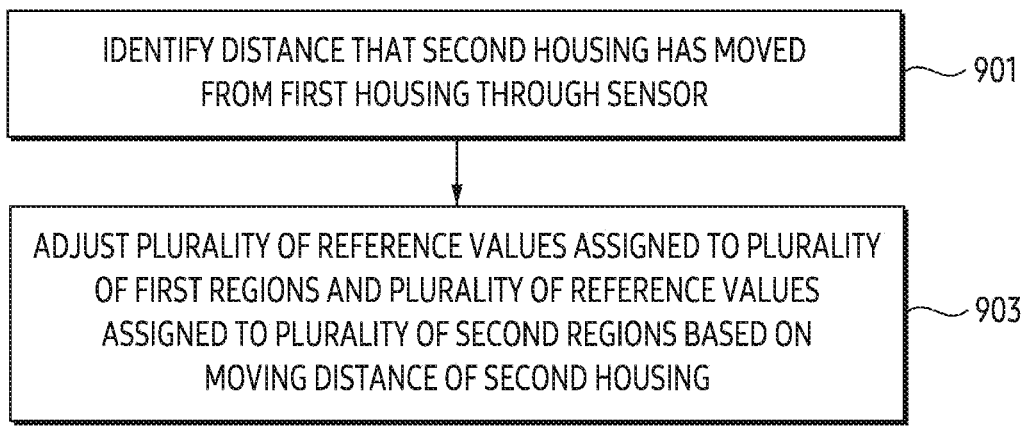
FIG. 9B is a flowchart indicating an embodiment of adjusting an intensity of vibration of vibration motors based on a moving distance of a second housing of an electronic device.

FIG. 9A indicates an embodiment in which a first vibration motor and a second vibration motor operate based on a state of an electronic device. FIG. 9B is a flowchart indicating an embodiment of adjusting an intensity of vibration of vibration motors based on a moving distance of a second housing of an electronic device.

In an embodiment, a processor (e.g., a processor 120 of FIG. 5) may adjust a first reference value and a second reference value based on the state of the electronic device 200. Referring to FIG. 9A, in case that the electronic device 200 is in a first state, the overall size of the electronic device 200 may be relatively small, and in case that the electronic device 200 is in a second state, the overall size of the electronic device 200 may be relatively large. In case that the state of the electronic device 200 is in the first state, since the overall size of the electronic device 200 is relatively small, sufficient vibration may be provided to a user even when the electronic device 200 provides a relatively small intensity of vibration. In case that the state of the electronic device 200 is in the second state, since the overall size of the electronic device 200 is relatively large, the intensity of relatively large vibration may be provided to provide sufficient vibration to the user.

In an embodiment, the processor 120 may control a first vibration motor 270 and a second vibration motor 280 based on the state of the electronic device 200. Referring to FIG. 9B, in operation 901, the processor 120 may identify a distance that a second housing 220 has moved from a first housing 210 through a sensor 290 (e.g., a sensor 290 of FIG. 5). In an embodiment, the processor 120 may receive data on magnitude and/or a direction of a magnetic field by a magnetic material disposed on the second housing 220 and/or a flexible display 230 through the sensor 290, for example. The processor 120 may detect a moving distance of the second housing 220 based on the received magnetic field-related data. The sensor 290 may transmit sensing data on the moving distance of the second housing 220 to the processor 120. In an embodiment, the processor 120 may identify the state of the electronic device 200 through the sensor 290. The operation 901 may be also referred to as an operation 701 of FIG. 7B.

In operation 903, the processor 120 may adjust a plurality of reference values assigned to a plurality of first regions 235a, 235b, 235c, 235d, and 235e and the plurality of the reference values assigned to the plurality of second regions 236a, 236b, 236c, 236d, and 236e based on the moving distance of the second housing 220 obtained through the sensor 290. In an embodiment, the plurality of the reference values assigned to the plurality of first regions 235a, 235b, 235c, 235d, and 235e and the plurality of the reference values assigned to the plurality of second regions 236a, 236b, 236c, 236d, and 236e may be designated based on the first state of the electronic device 200, for example. In the first state, the processor 120 may identify a location of a contact point of a touch input, and identify the first reference value and the second reference value based on the identified location of the contact point. The processor 120 may provide the intensity of vibration corresponding to the first reference value using the first vibration motor in the first state and provide the intensity of vibration corresponding to the second reference value using the second vibration motor 280. In response to identifying that the state of the electronic device 200 changes from the first state to the second state through the sensor 290, the processor 120 may increase the plurality of the reference values assigned to the plurality of first regions 235a, 235b, 235c, 235d, and 235e and the plurality of the reference values assigned to the plurality of second regions 236a, 236b, 236c, 236d, and 236e. The plurality of the reference values may correspond to the moving distance of the second housing 220 to the first housing 210. In an embodiment, as the moving distance of the second housing 220 increases, the plurality of the reference values may increase, for example. When the moving distance of the second housing 220 is the maximum moving distance (e.g., a designated distance d2 of FIG. 2C), the plurality of the reference values may have a maximum value. The processor 120 may adjust the plurality of the reference values. The first reference value and the second reference value assigned to the region including the location of the contact point may be changed according to the state of the electronic device 200 or the moving distance of the second housing 220. In an embodiment, the processor 120 may provide the user with vibration of the constant intensity of vibration even when the state of the electronic device 200 is changed by adjusting the plurality of the reference values based on the moving distance of the second housing 220.

Figure 10A:
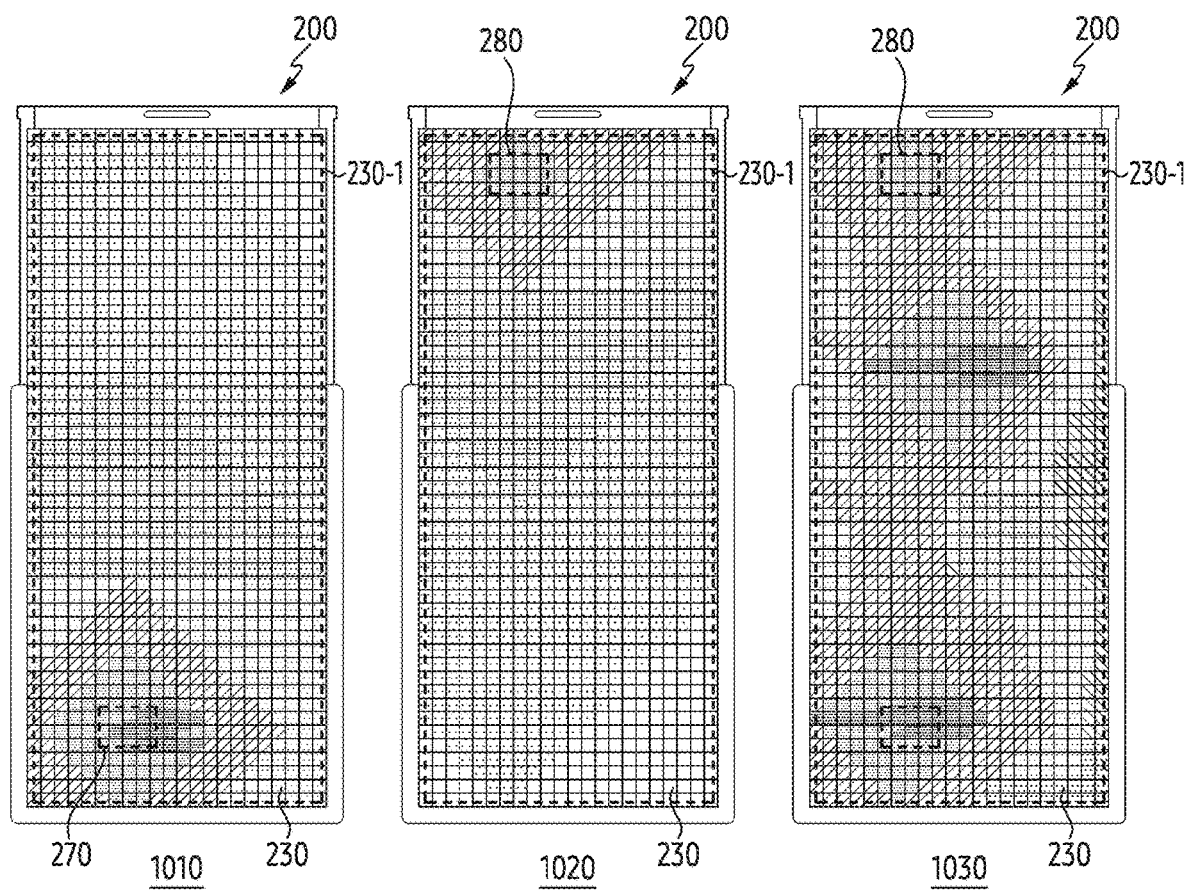
FIG. 10A indicates an embodiment of vibration transmitted to a designated region of an electronic device.
Figure 10B:
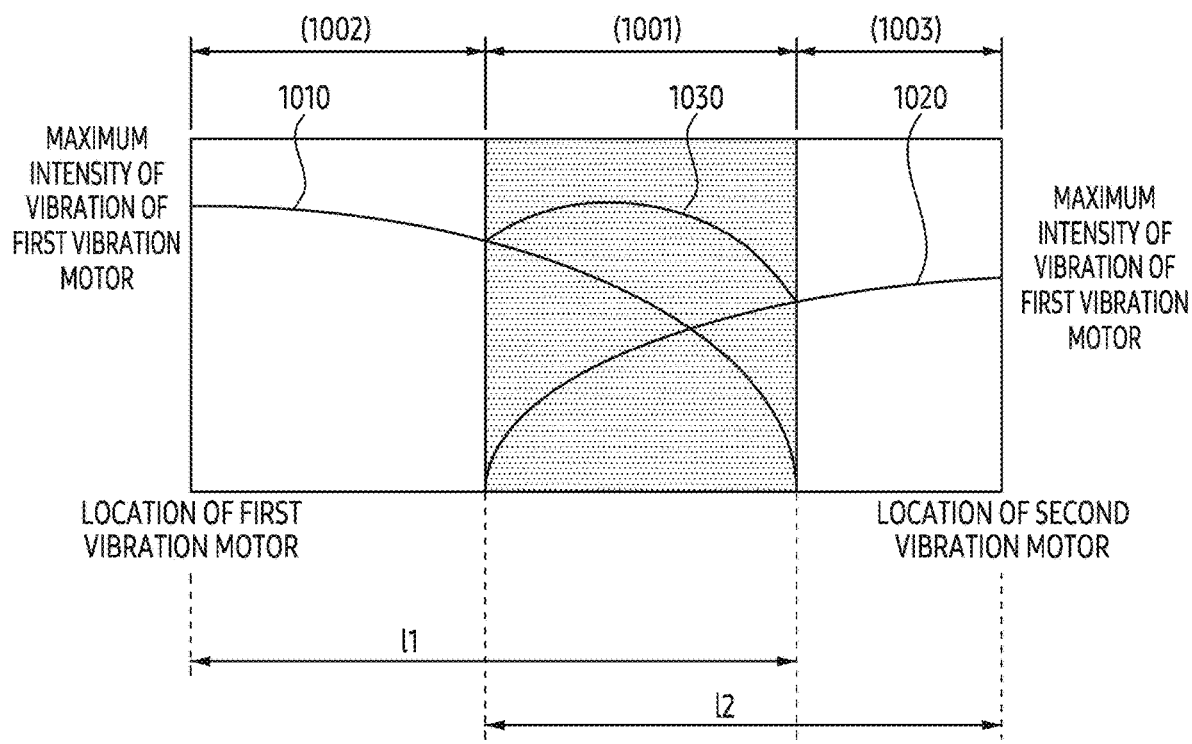
FIG. 10B is a graph indicating an embodiment of vibration transmitted according to a distance from vibration motors to a designated region of an electronic device.

FIG. 10A indicates an embodiment of vibration transmitted to a designated region of an electronic device. FIG. 10B is a graph indicating an embodiment of vibration transmitted according to a distance from vibration motors to a designated region of an electronic device.

Referring to FIG. 10A, a processor (e.g., a processor 120 of FIG. 5) may maintain an intensity of vibration transmitted to a contact point of a touch input in the designated region 230-1 in a predetermined range through a first vibration motor 270 and a second vibration motor 280. A state 1010 of FIG. 10A indicates the intensity of vibration in which vibration provided from the first vibration motor 270 is transmitted to the designated region 230-1. The state 1020 of FIG. 10A indicates the intensity of vibration in which the vibration provided from the second vibration motor 280 is transmitted to the designated region 230-1. The state 1030 of FIG. 10A indicates the intensity of vibration in which the vibration provided from the first vibration motor 270 and the second vibration motor 280 is transmitted to the designated region 230-1. The lower brightness displayed in the designated region 230-1 of FIG. 10A indicates the stronger vibration intensity, and the higher brightness displayed in the designated region 230-1 indicates the weaker vibration intensity.

Referring to the state 1010, as the distance from the first vibration motor 270 increases, the intensity of vibration transmitted from the first vibration motor 270 may decrease. Referring to the state 1020, as the distance from the second vibration motor 280 increases, the intensity of vibration transmitted from the second vibration motor 280 may decrease. Referring to the state 1030, the processor 120 may control the first vibration motor 270 and the second vibration motor 280 so that the sum of the intensity of vibration transmitted from the first vibration motor 270 and the intensity of vibration transmitted from the second vibration motor 280 is maintained in a designated range.

In an embodiment, the processor 120 may control the first vibration motor 270 and the second vibration motor 280 based on a first distance and a second distance. A graph of the state 1010 of FIG. 10B indicates a change in the intensity of vibration transmitted from the first vibration motor 270 to the designated region 230-1 according to the first distance between the first vibration motor 270 and the location of the contact point. A graph of the state 1020 indicates the change in the intensity of vibration transmitted from the second vibration motor 280 to the designated region 230-1 according to the second distance between the second vibration motor 280 and the location of the contact point. In the graph of FIG. 10B, the x-axis indicates the location on the designated region 230-1, and the y-axis indicates the intensity of vibration of the vibration motor.

In an embodiment, the processor 120 may, based on identifying the first distance less than a reference distance and the second distance less than the reference distance, provide the haptic notification through the first vibration motor 270 and the second vibration motor 280, by providing the intensity of vibration corresponding to the first distance using the first vibration motor 270 and the intensity of vibration corresponding to the second distance using the second vibration motor 280.

Referring to FIG. 10B, the location of contact point included in the first distance less than the reference distance and the second distance less than the reference distance may be included in the region A 1001. The intensity of the maximum vibration of the first vibration motor 270 and the intensity of the maximum vibration of the second vibration motor 280 may be the same or different from each other. In case that the intensity of the maximum vibration of the first vibration motor 270 and the intensity of the maximum vibration of the second vibration motor 280 are different from each other, the first reference distance 11 with respect to the first distance and the second reference distance 12 with respect to the second distance may be different. In an embodiment, in case that the intensity of the maximum vibration of the first vibration motor 270 is greater than the intensity of the maximum vibration of the second vibration motor 280, the first reference distance 11 may be greater than the second reference distance 12, for example.

In an embodiment, in case that the touch input to region A 1001 is identified, the first distance may be less than the first reference distance 11, and the second distance may be less than the second reference distance 12. The processor 120 may, based on identifying the first distance less than the first reference distance 11 and the second distance less than the second reference distance 12, provide the haptic notification using the first vibration motor 270 and the second vibration motor 280. The processor 120 may provide the intensity of vibration corresponding the first distance using the first vibration motor 270, and provide the intensity of vibration corresponding to the second distance using the second vibration motor 280. By the intensity of the vibration by the first vibration motor 270 and the intensity of the vibration by the second vibration motor 280, the intensity of vibration in region A 1001 of the designated region 230-1 may appear in a graph of the state 1030.

As the first distance increases, the intensity of vibration corresponding to the first distance may increase, and as the second distance increases, the intensity of vibration corresponding to the second distance may increase. In an embodiment, the processor 120 may provide, through the first vibration motor 270, the intensity of vibration corresponding to the first reference value assigned to the designated region 230-1 including the first distance among the plurality of first regions 235a, 235b, 235c, 235d, and 235e of FIG. 8A, and through the second vibration motor 280, may provide the intensity of vibration corresponding to the second reference value assigned to the designated region 230-1 including the second distance among the plurality of second regions 236a, 236b, 236c, 236d, and 236e of FIG. 8B, for example.

In an embodiment, the processor 120 may, based on identifying the first distance less than the reference distance and the second distance greater than or equal to the reference distance, provide the haptic notification through the first vibration motor 270 of the first vibration motor 270 and the second vibration motor 280, providing the intensity of vibration corresponding the first distance using the first vibration motor 270.

In an embodiment, the location of contact point included in the first distance less than the reference distance and the second distance greater than or equal to the reference distance may be included in the region B 1002. In an embodiment, in case that the touch input to the region B 1002 is identified, the first distance may be less than the first reference distance 11, and the second distance may be greater than or equal to the second reference distance 12. The processor 120 may, based on identifying the first distance less than the first reference distance 11 and the second distance greater than or equal to the second reference distance 12, provide the haptic notification using the first vibration motor 270. The processor 120 may provide the intensity of vibration corresponding the first distance using the first vibration motor 270.

In an embodiment, the processor 120 may, based on identifying the first distance greater than or equal to the reference distance and the second distance less than the reference distance, provide the haptic notification through the second vibration motor 280 of the first vibration motor 270 and the second vibration motor 280, providing the intensity of vibration corresponding the second distance using the second vibration motor 280.

In an embodiment, the location of contact point included in the first distance greater than or equal to the reference distance and the second distance less than the reference distance may be included in the region C 1003. In an embodiment, in case that the touch input to the region C 1003 is identified, the first distance may be greater than or equal to the first reference distance 11, and the second distance may be less than the second reference distance 12. The processor 120 may, based on identifying the first distance greater than or equal to the first reference distance 11 and the second distance less than the second reference distance 12, provide the haptic notification using the second vibration motor 280. The processor 120 may provide the intensity of vibration corresponding the second distance using the second vibration motor 280.

In an embodiment, the processor 120 may maintain the intensity of vibration transmitted to the entirety of the designated region 230-1 in a predetermined range by controlling the first vibration motor 270 and the second vibration motor 280 based on the first distance and the second distance according to the location of the contact point. The processor 120 may reduce unnecessary power consumption and provide the constant haptic notification by controlling whether the first vibration motor 270 and the second vibration motor 280 operate and the intensity of vibration according to the location of the contact point.

Figure 11A:
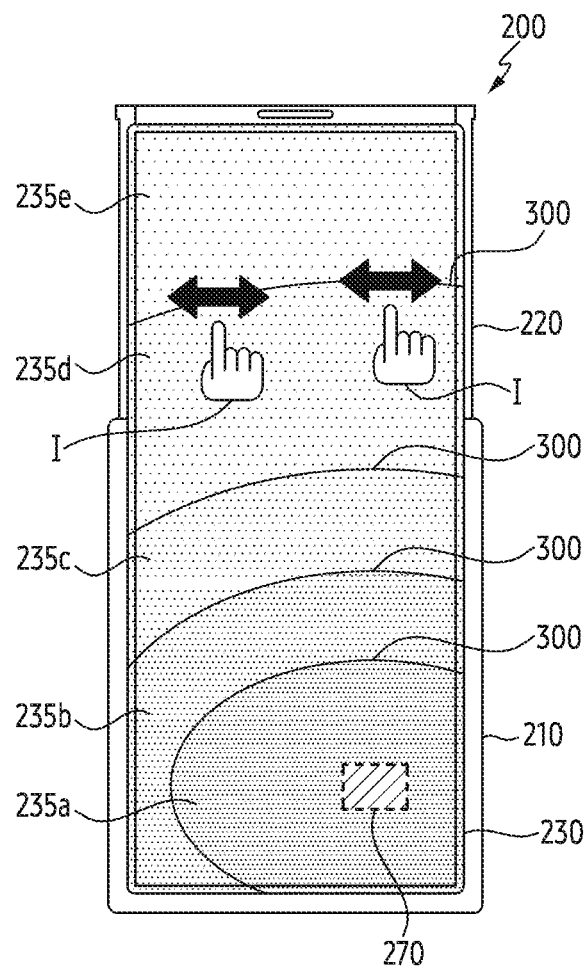
FIG. 11A indicates an embodiment of a state in which a plurality of visual objects for representing each of the plurality of first regions is displayed on a display of an electronic device.
Figure 11B:
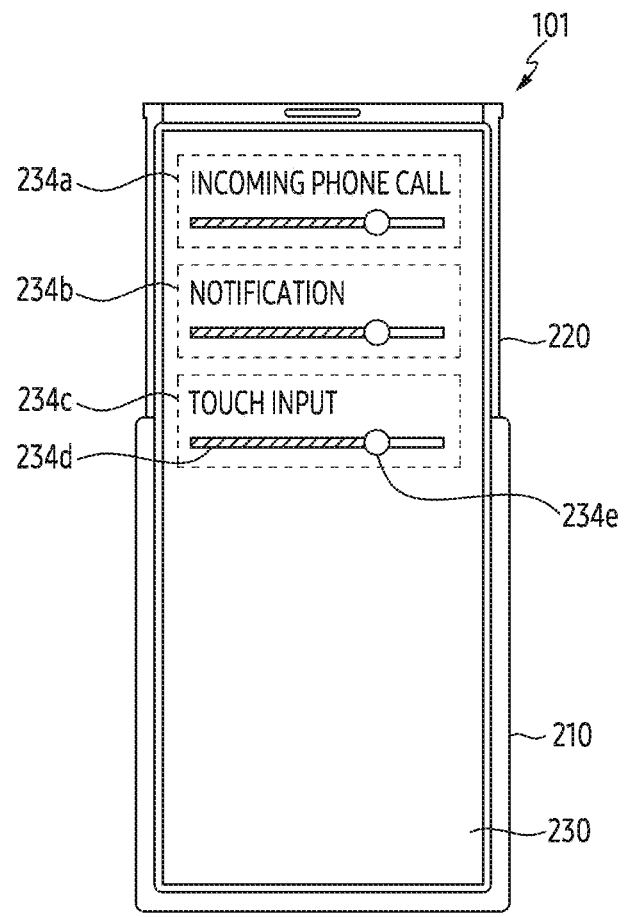
FIG. 11B indicates an embodiment of a setting window provided through a flexible display.
Figure 11C:
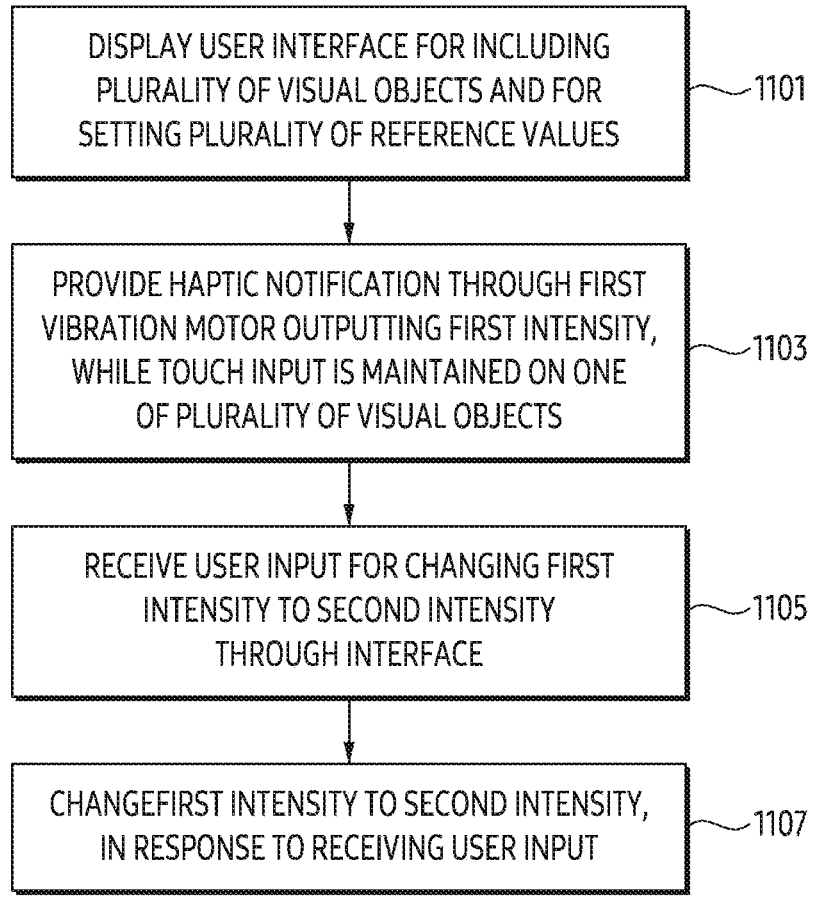
FIG. 11C is a flowchart indicating an embodiment of adjusting reference values through an interface of an electronic device.

FIG. 11A indicates a state in which a plurality of visual objects for representing each of the plurality of first regions is displayed on a display of an electronic device. FIG. 11B indicates an embodiment of a setting window provided through a flexible display. FIG. 11C is a flowchart indicating an embodiment of adjusting reference values through an interface of an electronic device.

Referring to FIG. 11A, a processor (e.g., a processor 120 of FIG. 5) may display a user interface including a plurality of visual objects for representing each of the plurality of first regions 235a, 235b, 235c, 235d, and 235e through a flexible display 230. In an embodiment, the processor 120 may divide the designated region 230-1 into the plurality of visual objects 300 indicating a boundary of the plurality of first regions 235a, 235b, 235c, 235d, and 235e, for example. The user may distinguish the plurality of first regions 235a, 235b, 235c, 235d, and 235e through the plurality of visual objects 300 displayed on the flexible display 230.

The plurality of first regions 235a, 235b, 235c, 235d, and 235e may be changed by a user input I. In an embodiment, the processor 120 may receive the user input I for designating the plurality of first regions 235a, 235b, 235c, 235d, and 235e through the designated region 230-1 of the flexible display 230. In an embodiment, the processor 120 may receive the user input I for any one of the plurality of visual objects 300 for representing each of the plurality of first regions 235a, 235b, 235c, 235d, and 235e. In an embodiment, the processor 120 may display the plurality of visual objects 300 for representing each of a first sub-region 235a, a second sub-region 235b, a third sub-region 235c, a fourth sub-region 235d, and a fifth sub-region 235e, and may receive the user input for any one of the plurality of visual objects, for example. In an embodiment, the user may provide a swipe input to the boundary to change the boundary of the visual object for representing the fourth sub-region 235d, for example.

In an embodiment, the processor 120 may designate the plurality of first regions 235a, 235b, 235c, 235d, and 235e based on the user input I. In an embodiment, when receiving the swipe input for the visual object for representing the fourth sub-region 235d, the processor 120 may change the fourth sub-region 235d to correspond to the swipe input, for example. In response to identifying that the plurality of first regions 235a, 235b, 235c, 235d, and 235e are changed, the processor 120 may change the plurality of visual objects 300 to correspond to the plurality of changed first regions 235a, 235b, 235c, 235d, and 235e. In an embodiment, in case that the boundary of the fourth sub-region 235d is changed, the processor 120, based on the changed fourth sub-region 235d, may display the plurality of visual objects 300 for indicating the plurality of first regions 235a, 235b, 235c, 235d, and 235e through the designated region 230-1 of the flexible display 230, for example. The user may recognize the plurality of changed first regions 235a, 235b, 235c, 235d, and 235e through the plurality of visual objects.

The description of the plurality of first regions 235a, 235b, 235c, 235d, and 235e described with reference to FIG. 11A may be applied substantially the same to a second vibration motor (e.g., a second vibration motor 280 of FIG. 8B) and the plurality of second regions (e.g., a plurality of second regions 236a, 236b, 236c, 236d, and 236e of FIG. 8B). In an embodiment, the processor 120 may display the plurality of visual objects 300 for representing each of the plurality of second regions 236a, 236b, 236c, 236d, and 236e (e.g., a plurality of second regions 236a, 236b, 236c, 236d, and 236e of FIG. 8B) through the flexible display 230, for example. The processor 120 may receive the user input I for the plurality of visual objects 300 for representing each of the plurality of second regions 236a, 236b, 236c, 236d, and 236e. The processor 120 may designate the plurality of second regions 236a, 236b, 236c, 236d, and 236e based on the user input I. In an embodiment, the user may directly designate the plurality of first regions 235a, 235b, 235c, 235d, and 235e and the plurality of second regions 236a, 236b, 236c, 236d, and 236e based on the intensity of vibration recognized by the user.

Referring to FIGS. 11B and 11C, in operation 1101, the processor 120 may display the user interface for setting the plurality of first reference values assigned to each of the plurality of first regions 235a, 235b, 235c, 235d, and 235e or the plurality of second regions 236a, 236b, 236c, 236d, and 236e through the designated region 230-1 of the flexible display 230. The processor 120 may adjust a target intensity of vibration of the haptic notification through the user input to the user interface. In an embodiment, the user interface may include a first input region 234a capable of adjusting the target intensity of vibration of the haptic notification for incoming phone call, a second input region 234b capable of adjusting the target intensity of vibration of the haptic notification for an event related to the electronic device 200, and a third input region 234c capable of adjusting the target intensity of vibration of the haptic notification for the touch input. The first input region 234a, the second input region 234b, and the third input region 234c may include visual objects capable of adjusting the intensity of vibration, for example. In an embodiment, the first input region 234a, the second input region 234b, and the third input region 234c may include an adjustment bar 234d indicating a range of vibration intensity and an adjustment button 234e for selecting the intensity of vibration, for example, but are not limited thereto.

In operation 1103, the processor 120 may provide the haptic notification through the first vibration motor 270 and/or the second vibration motor 280 outputting a first intensity, while the touch input is maintained on one of the plurality of visual objects 300. In an embodiment, the user may recognize the first intensity of the first vibration motor 270 and/or the second vibration motor 280 assigned to the third sub-region 235c by maintaining the touch input on the visual object for indicating the third region of the plurality of visual objects 300, for example.

In operation 1105, the processor 120 may receive the user input for changing the first intensity to the second intensity through the user interface, after the haptic notification is provided through the first vibration motor 270 and/or the second vibration motor 280 outputting the first intensity.

In an embodiment, after the haptic notification is provided, the processor 120 may receive the user input related to magnitude of vibration transmitted to the contact point. In an embodiment, the user input may include a predetermined operation (e.g., a designated number of touches, a designated swipe operation, or input through a physical key button), for example. The processor 120 may adjust the intensity of vibration of the first vibration motor 270 and/or the second vibration motor 280 in response to receiving the predetermined operation.

In another embodiment, the processor 120 may provide the setting window of FIG. 11B through the display in response to receiving the predetermined operation. In an embodiment, the processor 120 may receive the user input for changing the first intensity to the second intensity through the interface. In an embodiment, the user may provide the user input for the target intensity of vibration by adjusting the location of the adjustment button 234e at the adjustment bar 234d of the third input region 234c capable of adjusting the target intensity of vibration of the haptic notification for the touch input, for example. The user may change the target intensity of the vibration of the haptic notification from the first intensity to the second intensity by dragging the adjustment button 234e from the adjustment bar 234d.

In operation 1107, the processor 120 may change the plurality of the reference values based on the second intensity, in response to receiving the user input. In an embodiment, the processor 120 may change the first intensity assigned to the region corresponding to one visual object among the plurality of visual objects in which the touch input is maintained to the second intensity, for example. The processor 120 may transmit the second intensity to the region corresponding to the one visual object through the first vibration motor 270 and/or the second vibration motor 280 according to the user input. The processor 120 may receive the user input for changing the second intensity to the third intensity through the user interface after the haptic notification is provided through the first vibration motor 270 and/or the second vibration motor 280 outputting the second intensity. In case that the user feels that the vibration of the region corresponding to the one visual object is insufficient, the user input may be additionally provided, and the processor 120 may change the second intensity to the third intensity in response to receiving the additional user input.

In an embodiment, the processor 120 may change the plurality of the reference values based on the first intensity assigned to the plurality of first regions 235a, 235b, 235c, 235d, and 235e and the plurality of second regions 236a, 236b, 236c, 236d, and 236e to the plurality of the reference values based on the second intensity, based on identifying that the target intensity of the haptic notification is changed to the second intensity greater than the first intensity through the user input. As the plurality of the reference values are changed to the plurality of the reference values based on the second intensity, the target intensity of the haptic notification may be increased. In another embodiment, in response to identifying that the target intensity of the haptic notification is changed to the second intensity smaller than the first intensity through the user input, the plurality of the reference values based on the first intensity assigned to the plurality of first regions 235a, 235b, 235c, 235d, and 235e and the plurality of second regions 236a, 236b, 236c, 236d, and 236e may be changed to the plurality of the reference values based on the second intensity. As the plurality of the reference values are changed to the plurality of the reference values based on the second intensity, the target intensity of the haptic notification may be reduced. In an embodiment, the electronic device 200 may freely adjust the intensity of the target vibration provided through the haptic notification according to a selection of the user.

Figure 12A:
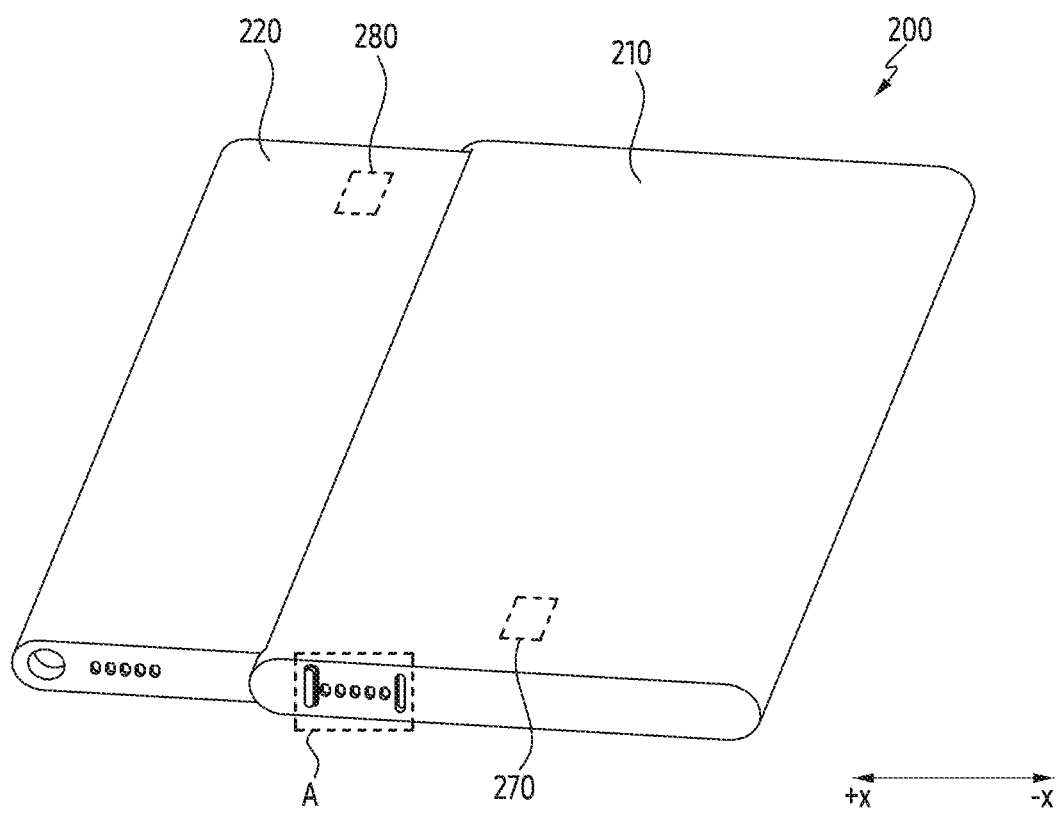
FIG. 12A illustrates an embodiment of a stopper of an electronic device.
Figure 12B:
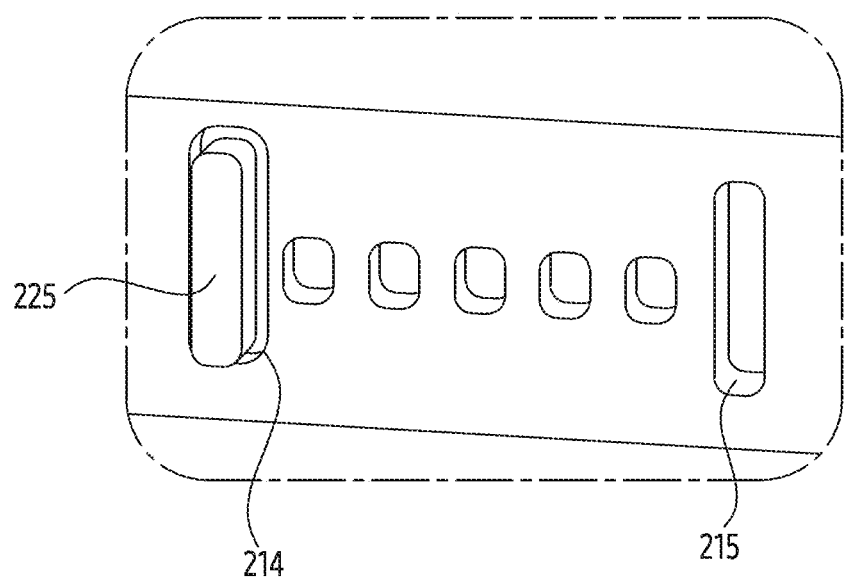
FIG. 12B is an enlarged view of an area A of FIG. 12A.

FIG. 12A illustrates an embodiment of a stopper of an electronic device, and FIG. 12B is an enlarged view of an area A of FIG. 12A.

Referring to FIG. 12A, a second housing 220 may be movably coupled in a first direction (e.g., in the +x direction) or a second direction (e.g., in the −x direction) opposite to the first direction with respect to a first housing 210. A first vibration motor 270 may be disposed in the first housing 210, and a second vibration motor 280 may be disposed in the second housing 220. The electronic device 200 illustrated in FIG. 12A may be substantially the same as the above-described embodiments, except for a coupling direction of the first housing 210 and the second housing 220.

In an embodiment, the second housing 220 may include a stopper 225 coupled to the first housing 210, in a first state in which a flexible display 230 is movable in the first direction (e.g., in the +x direction) of the first direction and the second direction (e.g., in the −x direction) and in a second state in which the flexible display 230 is movable in the second direction of the first direction and the second direction. The second state may mean the state in which a moving distance of the second housing 220 to the first housing 210 is the maximum moving distance.

In an embodiment, the stopper 225 may be disposed on a side bezel member of the second housing 220. The side bezel member of the first housing 210 may define a first groove 214 and a second groove 215 into which the stopper 225 may be inserted. The first groove 214 may be defined at a location overlapping the stopper 225 when the electronic device 200 is viewed in the +y direction in the first state. The second groove 215 may be defined at the location overlapping the stopper 225 when the electronic device 200 is viewed in the +y direction in the second state.

In an embodiment, the stopper 225 may transmit vibration of the first vibration motor 270 to the second housing 220 and the vibration of the second vibration motor 280 to the first housing 210 by being coupled to the groove of the first housing 210 in the first state or the second state. In the first state, the stopper 225 may be inserted into the first groove 214. In the first state, the vibration generated from the first vibration motor 270 may be transmitted to the second housing 220 through the stopper 225 connected to the second housing 220. From the first state, as the second housing 220 moves in the first direction (e.g., the +x direction), the stopper 225 may move in the first direction. In the second state, the stopper 225 may be inserted into the second groove 215. In the second state, the vibration generated from the first vibration motor 270 may be transmitted to the second housing 220 through the stopper 225 connected to the second housing 220. By connecting the first housing 210 and the second housing 220, the stopper 225 may stably fix the location of the second housing 220 in the first state or the second state.

According to the embodiment, as the moving distance of the second housing 220 to the first housing 210 increases, a contact area between the first housing 210 and the second housing 220 may decrease. The area where the first housing 210 and the second housing 220 are in contact decreases, it may be difficult for the vibration generated from the first vibration motor 270 to be transmitted to the second housing 220, and it may be difficult for the vibration generated from the second vibration motor 280 to be transmitted to the first housing 210. The electronic device 200 may further secure the contact area between the first housing 210 and the third housing in the first state or the second state through the stopper 225. In an embodiment, the stopper 225 may evenly transmit the vibration to the entirety of the region of the electronic device 200 by transmitting the vibration of the first vibration motor 270 and the second vibration motor 280. The stopper 225 may include a flexible material (e.g., polymer) so as not to be damaged when inserted into or separated from the groove, and may include a material having a relatively high transmission power of mechanical vibration.

An electronic device (e.g., an electronic device 200 of FIG. 4) in an embodiment may include a first housing (e.g., a first housing 210 of FIG. 4), a second housing (e.g., a second housing 220 of FIG. 4), a flexible display (e.g., a flexible display 230 of FIG. 4), a first vibration motor (e.g., a first vibration motor 270 of FIG. 4), a second vibration motor (e.g., a second vibration motor 280 of FIG. 4), and at least one processor (e.g., a processor 120 of FIG. 5).

The second housing may be movably coupled to the first housing in a first direction or a second direction opposite to the first direction with respect to the first housing.

The flexible display may be capable of sliding-out from the first housing as the second housing moves in the first direction. The flexible display may be capable of sliding-in into the first housing as the second housing moves in the second direction.

The first vibration motor may be disposed in the first housing.

The second vibration motor may be disposed in the second housing.

The at least one processor may be operably connected to the first vibration motor and the second vibration motor. The at least one processor may receive a touch input for the flexible display. The at least one processor may identify, in response to the touch input, a first distance (e.g., a first distance d1 of FIG. 6B) between a location of a contact point of the touch input and the first vibration motor, and a second distance (e.g., a second distance d2 of FIG. 6B) between the location and the second vibration motor. The at least one processor may provide a haptic notification for the touch input, by adjusting an intensity of vibration provided through the first vibration motor and the second vibration motor based on identifying the first distance and the second distance.

In an embodiment, the at least one processor may provide the haptic notification through the first vibration motor of the first vibration motor and the second vibration motor, based on identifying the first distance less than the reference distance and the second distance greater than or equal to the reference distance. The at least one processor may provide the haptic notification through the second vibration motor of the first vibration motor and the second vibration motor, based on identifying the first distance greater than or equal to the reference distance and the second distance less than the reference distance.

According to this embodiment, the at least one processor may receive the touch input for the flexible display, in a first state in which the flexible display is movable in the first direction of the first direction and the second direction. The at least one processor may provide the haptic notification, in response to the touch input, through the first vibration motor.

According to this embodiment, the at least one processor may receive the touch input through a designated region (e.g., a designated region 230-1 of FIG. 6B) of the flexible display, in a second state distinguished from the first state in which the flexible display is movable in the first direction of the first direction and the second direction. The at least one processor may identify a first reference value which is assigned to the designated region including the location of the contact point of the touch input, among a plurality of reference values, indicating the intensity of vibration to be provided through the first vibration motor, assigned to each of the plurality of first regions (e.g., a plurality of first regions 235a, 235b, 235c, 235d, and 235e of FIG. 8A), where the plurality of first regions is designated based on the reference distance from the first vibration motor in the designated region of the flexible display. The at least one processor may identify a second reference value which is assigned to the designated region including the location of the contact point of the touch input, among the plurality of reference values, indicating the intensity of the vibration to be provided through the second vibration motor, assigned to each of the plurality of second regions (e.g., a plurality of second regions 236a, 236b, 236c, 236d, and 236e of FIG. 8B), where the plurality of second regions is designated based on the reference distance from the second vibration motor in the designated region of the flexible display.

In an embodiment, the at least one processor may provide the intensity of the vibration corresponding to the first reference value, using the first vibration motor based on the first reference value and the second reference value. The at least one processor may provide the haptic notification through the first vibration motor and the second vibration motor, by providing the intensity of the vibration corresponding to the second reference value, using the second vibration motor.

In an embodiment, the plurality of the reference values, indicating the intensity of the vibration to be provided through the first vibration motor, assigned to each of the plurality of first regions, may correspond to the first distance. The plurality of the reference values, indicating the intensity of the vibration to be provided through the second vibration motor, assigned to each of the plurality of second regions, may correspond to the second distance.

In an embodiment, the at least one processor may display a user interface including the plurality of visual objects for representing each of the plurality of first regions and for setting the plurality of the reference values. The at least one processor may provide the haptic notification through the first vibration motor outputting a first intensity, while the touch input is maintained on one of the plurality of visual objects. The at least one processor may receive a user input for changing the first intensity to a second intensity through the user interface, after the haptic notification is provided through the first vibration motor outputting the first intensity. The at least one processor may change the plurality of the reference values based on the second intensity, in response to the user input.

In an embodiment, the at least one processor may identify a region including the location, among the plurality of first regions designated based on the reference distance from the first vibration motor in the designated region of the flexible display, in the first state in which the second housing is movable in the first direction of the first direction and the second direction. The at least one processor may identify the first reference value assigned to the region including the location, among the plurality of the reference values, indicating the intensity of the vibration to be provided through the first vibration motor, assigned to each of the plurality of first regions. The at least one processor may provide the haptic notification through the first vibration motor, by providing the intensity of the vibration corresponding to the first reference value, using the first vibration motor, based on the first reference value.

In an embodiment, the at least one processor may, based on identifying the first distance less than the reference distance and the second distance less than the reference distance, provide the intensity of the vibration corresponding to the first distance using the first vibration motor. The at least one processor may provide the haptic notification through the first vibration motor and the second vibration motor, by providing the intensity of the vibration corresponding to the second distance using the second vibration motor. The at least one processor may, based on identifying the first distance less than the reference distance and the second distance greater than or equal to the reference distance, provide the haptic notification through the first vibration motor of the first vibration motor and the second vibration motor, by providing the intensity of the vibration corresponding the first distance using the first vibration motor. The at least one processor may, based on identifying the first distance greater than or equal to the reference distance and the second distance less than the reference distance, provide the haptic notification through the second vibration motor of the first vibration motor and the second vibration motor, by providing the intensity of the vibration corresponding the second distance using the second vibration motor.

In an embodiment, the intensity of the vibration of the second vibration motor for transmitting the haptic notification to the contact point through the second vibration motor, in the first state in which the flexible display is movable in the first direction of the first direction and the second direction, may be less than the intensity of the vibration of the second vibration motor for transmitting the haptic notification to the contact point through the second vibration motor, in the second state distinguished from the first state.

In an embodiment, the at least one processor may receive the user input to change the target intensity of the haptic notification from the first intensity to the second intensity. The at least one processor may, in response to the user input, change the plurality of first reference values designated based on the first intensity based on the second intensity.

The electronic device in an embodiment may further include a sensor (e.g., a sensor 290 of FIG. 5) detecting a moving distance of the second housing. The at least one processor may obtain the sensing data related to the moving distance through the sensor. The at least one processor may adjust the plurality of the reference values assigned to each of the plurality of first regions and the plurality of the reference values assigned to each of the plurality of second regions based on the sensing data obtained through the sensor.

In an embodiment, the at least one processor may maintain the intensity of the vibration transmitted to the contact point of the touch input in the designated region in a predetermined range through the first vibration motor and the second vibration motor.

In an embodiment, the second housing may include a stopper (e.g., the stopper 225 in an area A of FIG. 12B) coupled to the first housing, in the first state in which the flexible display is movable in the first direction of the first direction and the second direction and in the second state in which the flexible display is movable in the second direction of the first direction and the second direction.

The electronic device in an embodiment may further include a drive motor (e.g., a drive motor 261 of FIG. 4) providing driving force, a pinion gear (e.g., a pinion gear 262 of FIG. 4) coupled to the drive motor and rotatable by a driving force provided from the drive motor, and a rack gear (e.g., a rack gear 263 of FIG. 4) engaged with the pinion gear and executing linear reciprocation according to the rotation of the pinion gear. The second vibration motor may be spaced apart from the rack gear in the first direction.

In an embodiment, the at least one processor may receive the user input, through the designated region of the flexible display, to designate the plurality of first regions or the plurality of second regions. The at least one processor may designate the plurality of first regions or the plurality of second regions, based on the user input.

A method of an electronic device in an embodiment may include receiving the touch input for the flexible display of the electronic device, identifying, in response to the touch input, the first distance between the location of the contact point of the touch input and the first vibration motor disposed in the first housing of the electronic device, and the second distance between the location and the second vibration motor disposed in the second housing of the electronic device, and providing the haptic notification for the touch input, adjusting the intensity of the vibration to be provided through the first vibration motor and the second vibration motor based on identifying the first distance and the second distance.

The method in an embodiment may include providing the haptic notification through the first vibration motor of the first vibration motor and the second vibration motor, based on identifying the first distance less than the reference distance and the second distance greater than or equal to the reference distance, and providing the haptic notification through the second vibration motor of the first vibration motor and the second vibration motor, based on identifying the first distance greater than or equal to the reference distance and the second distance less than the reference distance.

The method in an embodiment may include receiving the touch input through the designated region of the flexible display, in the first state in which the flexible display is movable in the first direction of the first direction and the second direction, and providing the haptic notification, in response to the touch input, through the first vibration motor.

The method in an embodiment may include receiving the touch input through the display area of the flexible display, in a second state in which the flexible display is movable in the second direction of the first direction and the second direction distinguished from a first state, identifying the first reference value which is assigned to the display area including the location, among the plurality of the reference values, indicating the intensity of the vibration to be provided through the first vibration motor, assigned to each of a plurality of first regions, where the plurality of first regions is designated based on the reference distance from the first vibration motor in the display area of the flexible display, and identifying the second reference value which is assigned to the display area including the location, among a plurality of the reference values, indicating the intensity of the vibration to be provided through the second vibration motor, assigned to each of the plurality of second regions, where the plurality of second regions is designated based on the reference distance from the second vibration motor in the display area of the flexible display.

The method in an embodiment may include providing, based on the first reference value, the intensity of the vibration corresponding to the first reference value, using the first vibration motor, and providing, based on the second reference value, the intensity of the vibration corresponding to the second reference value, using the second vibration motor.

The method in an embodiment may include displaying the user interface including the plurality of visual objects for representing each of the plurality of first regions and for setting the plurality of the reference values, may include providing the haptic notification through the first vibration motor outputting the first intensity, while the touch input is maintained on one of the plurality of visual objects, may include receiving the user input for changing the first intensity to the second intensity through the user interface, after the haptic notification is provided through the first vibration motor outputting the first intensity, and may include changing the plurality of the reference values based on the second intensity, in response to the user input.

The method in an embodiment may include identifying the region of the display area including the location, among the plurality of first regions designated based on the reference distance from the first vibration motor in the display area of the flexible display, in the first state in which the second housing is movable in the first direction of the first direction and the second direction, may include identifying the first reference value assigned to the display area including the location, among the plurality of the reference values, indicating the intensity of the vibration to be provided through the first vibration motor, assigned to each of the plurality of first regions, and may include providing the haptic notification through the first vibration motor, by providing the intensity of the vibration corresponding to the first reference value, using the first vibration motor, based on the first reference value.

The method in an embodiment may include providing the haptic notification through the first vibration motor and the second vibration motor, by providing the intensity of the vibration corresponding to the first distance, using the first vibration motor, and by providing the intensity of the vibration corresponding to the second distance using the second vibration motor, based on identifying the first distance less than the reference distance and the second distance less than the reference distance, may include providing the haptic notification through the first vibration motor of the first vibration motor and the second vibration motor, by providing the intensity of the vibration corresponding the first distance, using the first vibration motor, based on identifying the first distance less than the reference distance and the second distance greater than or equal to the reference distance, and may include providing the haptic notification through the second vibration motor of the first vibration motor and the second vibration motor, by providing the intensity of the vibration corresponding the second distance, using the second vibration motor, based on identifying the first distance greater than or equal to the reference distance and the second distance less than the reference distance.

The method in an embodiment may include receiving the user input to change the target vibration intensity from the first intensity to the second intensity, and may include changing, in response to the user input, the plurality of the reference values designated based on the first intensity based on the second intensity.

The method in an embodiment may include obtaining the sensing data related to the moving distance through the sensor the electronic device detecting a moving distance of the second housing, and may include adjusting the first reference value assigned to each of the plurality of first regions and the second reference value assigned to each of the plurality of second regions based on the sensing data obtained through the sensor.

The method in an embodiment may include maintaining a size of the vibration transmitted to the touch point in the display area in the predetermined range through the first vibration motor and the second vibration motor.

The method in an embodiment may include receiving the user input, through the display area of the flexible display, to designate the plurality of first regions or the plurality of second regions, and may include designating the plurality of first regions or the plurality of second regions, based on the user input.

The electronic device according to various embodiments may be one of various types of electronic devices. The electronic devices may include a portable communication device (e.g., a smartphone), a computer device, a portable multimedia device, a portable medical device, a camera, a wearable device, or a home appliance, for example. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. In an embodiment, in an embodiment, the module may be implemented in a form of an application-specific integrated circuit (ASIC), for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). In an embodiment, a processor (e.g., the processor 120) of the machine (e.g., the electronic device 101) may invoke at least one of the one or more instructions stored in the storage medium, and execute it, with or without using one or more other components under the control of the processor, for example. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:
   a first housing;
   a second housing movably coupled to the first housing in a first direction or a second direction opposite to the first direction with respect to the first housing;
   a flexible display sliding-out from the first housing as the second housing moves in the first direction, or sliding-in into the first housing as the second housing moves in the second direction;
   a first vibration motor disposed in the first housing;
   a second vibration motor disposed in the second housing;
   memory, comprising one or more storage mediums, storing instructions; and
   at least one processor operably connected to the first vibration motor and the second vibration motor,
   wherein the instructions, when executed by the at least one processor individually or collectively, cause the electronic device to:
   receive a touch input for the flexible display,
   identify, in response to the touch input, a first distance between a location of a contact point of the touch input and the first vibration motor, and a second distance between the location of the contact point of the touch input and the second vibration motor, and
   provide a haptic notification for the touch input, by adjusting an intensity of vibration provided through the first vibration motor and the second vibration motor based on identifying the first distance and the second distance.

2. The electronic device of claim 1,
   wherein the instructions, when executed by the at least one processor individually or collectively, cause the electronic device to:
   provide the haptic notification through the first vibration motor of the first vibration motor and the second vibration motor, based on identifying the first distance less than a reference distance and the second distance greater than or equal to the reference distance, and
   provide the haptic notification through the second vibration motor of the first vibration motor and the second vibration motor, based on identifying the first distance greater than or equal to the reference distance and the second distance less than the reference distance.

3. The electronic device of claim 1,
   wherein the instructions, when executed by the at least one processor individually or collectively, cause the electronic device to:
   receive the touch input for the flexible display, in a first state in which the second housing is movable in the first direction of the first direction and the second direction, and
   provide the haptic notification, in response to the touch input, through the first vibration motor of the first vibration motor and the second vibration motor.

4. The electronic device of claim 1,
   wherein the instructions, when executed by the at least one processor individually or collectively, cause the electronic device to:
   receive the touch input for a designated region of the flexible display, in a second state in which the second housing is movable in the second direction of the first direction and the second direction,
   identify a first reference value which is assigned to the designated region comprising the location of the contact point of the touch input, among a plurality of first reference values, indicating an intensity of vibration to be provided through the first vibration motor, assigned to each of a plurality of first regions, wherein the plurality of first regions is designated based on a reference distance from the first vibration motor in the designated region of the flexible display, and
   identify a second reference value which is assigned to the designated region comprising the location of the contact point of the touch input, among a plurality of second reference values, indicating an intensity of vibration to be provided through the second vibration motor, assigned to each of a plurality of second regions, wherein the plurality of second regions is designated based on the reference distance from the second vibration motor in the designated region of the flexible display.

5. The electronic device of claim 4,
   wherein the instructions, when executed by the at least one processor individually or collectively, cause the electronic device to provide the haptic notification through the first vibration motor and the second vibration motor, by providing an intensity of vibration corresponding to the first reference value through the first vibration motor and providing an intensity of vibration corresponding to the second reference value through the second vibration motor.

6. The electronic device of claim 4, wherein:
   the plurality of first reference values, indicating the intensity of vibration to be provided through the first vibration motor, assigned to each of the plurality of first regions, corresponds to the first distance, and
   the plurality of second reference values, indicating the intensity of vibration to be provided through the second vibration motor, assigned to each of the plurality of second regions, corresponds to the second distance.

7. The electronic device of claim 4,
   wherein the instructions, when executed by the at least one processor individually or collectively, cause the electronic device to:

display a user interface comprising a plurality of visual objects for representing each of the plurality of first regions and for setting the plurality of first reference values, provide the haptic notification through the first vibration motor outputting a first intensity, while the touch input is maintained on one of the plurality of visual objects, receive a user input for changing the first intensity to a second intensity through the user interface, after the haptic notification is provided through the first vibration motor outputting the first intensity, and change the plurality of first reference values based on the second intensity, in response to the user input.

8. The electronic device of claim 1, wherein, the instructions, when executed by the at least one processor individually or collectively, cause the electronic device to:

identify a region comprising the location of the contact point of the touch input, among the plurality of first regions designated based on a reference distance from the first vibration motor in a designated region of the flexible display, in a first state in which the second housing is movable in the first direction of the first direction and the second direction identify a first reference value assigned to the region comprising the location, among a plurality of first reference values, indicating an intensity of vibration to be provided through the first vibration motor, assigned to each of the plurality of first regions, and provide the haptic notification through the first vibration motor, by providing an intensity of vibration corresponding to the first reference value, using the first vibration motor, based on the first reference value.

9. The electronic device of claim 1, wherein, in a second state in which the second housing is movable in the second direction of the first direction and the second direction, the instructions, when executed by the at least one processor individually or collectively, cause the electronic device to:

based on identifying the first distance less than a reference distance and the second distance less than the reference distance, provide the haptic notification through the first vibration motor and the second vibration motor, by providing an intensity of vibration corresponding to the first distance through the first vibration motor and an intensity of vibration corresponding to the second distance through the second vibration motor, based on identifying the first distance less than the reference distance and the second distance greater than or equal to the reference distance, provide the haptic notification through the first vibration motor of the first vibration motor and the second vibration motor, by providing the intensity of vibration corresponding the first distance through the first vibration motor, and based on identifying the first distance greater than or equal to the reference distance and the second distance less than the reference distance, provide the haptic notification through the second vibration motor of the first vibration motor and the second vibration motor, by providing the intensity of vibration corresponding the second distance through the second vibration motor.

10. The electronic device of claim 1, wherein an intensity of vibration of the second vibration motor, in a first state in which the second housing is movable in the first direction of the first direction and the second direction, is less than an intensity of vibration of the second vibration motor, in a second state in which the second housing is movable in the second direction of the first direction and the second direction.

11. The electronic device of claim 1, wherein the instructions, when executed by the at least one processor individually or collectively, cause the electronic device to:

receive a user input to change a target intensity of vibration of the haptic notification from a first intensity to a second intensity, and in response to the user input, change a plurality of first reference values set based on the first intensity or a plurality of second reference values set based on the first intensity based on the second intensity, wherein the plurality of first reference values indicate an intensity of vibration to be provided through the first vibration motor assigned to each of a plurality of first regions, wherein the plurality of first regions is designated based on a reference distance from the first vibration motor in a designated region of the flexible display, and wherein the plurality of second reference values indicate an intensity of vibration to be provided through the second vibration motor assigned to each of a plurality of second regions, wherein the plurality of second regions is designated based on a reference distance from the second vibration motor in the designated region of the flexible display.

12. The electronic device of claim 1, further comprising a sensor which identifies a moving distance of the second housing, wherein the instructions, when executed by the at least one processor individually or collectively, cause the electronic device to:

obtain data related to the moving distance through the sensor, and change a plurality of first reference values and a plurality of second reference values based on the data obtained through the sensor, wherein the plurality of first reference values indicate an intensity of vibration to be provided through the first vibration motor assigned to each of a plurality of first regions, wherein the plurality of first regions is designated based on a reference distance from the first vibration motor in a designated region of the flexible display, and wherein the plurality of second reference values indicate an intensity of vibration to be provided through the second vibration motor assigned to each of a plurality of second regions, wherein the plurality of second regions is designated based on a reference distance from the second vibration motor in the designated region of the flexible display.

13. The electronic device of claim 1, wherein the second housing comprises a stopper coupled to the first housing, in a first state in which the second housing is movable in the first direction of the first direction and the second direction and in a second state in which the second housing is movable in the second direction of the first direction and the second direction.

14. The electronic device of claim 1, further comprising:

a drive motor providing driving force to the second housing;

a pinion gear coupled to the drive motor and rotatable by the driving force provided from the drive motor; and a rack gear engaged with the pinion gear and executing linear reciprocation according to a rotation of the pinion gear, wherein the second vibration motor is spaced apart from the rack gear in the first direction.

15. The electronic device of claim 1,
wherein the instructions, when executed by the at least one processor individually or collectively, cause the electronic device to:
receive a user input, through a designated region of the flexible display, to designate a plurality of first regions designated based on a reference distance from the first vibration motor in the designated region, or a plurality of second regions designated based on the reference distance from the second vibration motor in the designated region, and
designate the plurality of first regions or the plurality of second regions, based on the user input.

16. A method of an electronic device, the electronic device comprising a first housing and a second housing movably coupled to the first housing in a first direction or a second direction opposite to the first direction, the method comprising:
receiving a touch input for a flexible display of the electronic device,
identifying, in response to the touch input, a first distance between a location of a contact point of the touch input and a first vibration motor, and a second distance between the location of the contact point of the touch input and a second vibration motor, and
providing a haptic notification for the touch input, adjusting an intensity of vibration provided through the first vibration motor and the second vibration motor based on identifying the first distance and the second distance.

17. The method of claim 16, further comprising:
providing the haptic notification through the first vibration motor of the first vibration motor and the second vibration motor, based on identifying the first distance less than a reference distance and the second distance greater than or equal to the reference distance; and
providing the haptic notification through the second vibration motor of the first vibration motor and the second vibration motor, based on identifying the first distance greater than or equal to the reference distance and the second distance less than the reference distance.

18. The method of claim 16, further comprising:
receiving the touch input for the flexible display, in a first state in which the second housing is movable in the first direction of the first direction and the second direction; and
providing the haptic notification, in response to the touch input, through the first vibration motor of the first vibration motor and the second vibration motor.

19. The method of claim 16, further comprising:
receiving the touch input for a designated region of the flexible display, in a second state in which the second housing is movable in the second direction of the first direction and the second direction;
identifying a first reference value which is assigned to the designated region comprising the location of the contact point of the touch input, among a plurality of first reference values, indicating an intensity of vibration to be provided through the first vibration motor, assigned to each of a plurality of first regions, wherein the plurality of first regions is designated based on a reference distance from the first vibration motor in the designated region of the flexible display; and
identifying a second reference value which is assigned to the designated region comprising the location of the contact point of the touch input, among a plurality of second reference values, indicating an intensity of vibration to be provided through the second vibration motor, assigned to each of a plurality of second regions, wherein the plurality of second regions is designated based on the reference distance from the second vibration motor in the designated region of the flexible display.

20. The method of claim 16, wherein:
the first vibration motor is disposed in the first housing, and
the second vibration motor is disposed in the second housing.

* * * * *